United States Patent
Yamamoto et al.

(10) Patent No.: US 8,412,908 B2
(45) Date of Patent: Apr. 2, 2013

(54) STORAGE AREA DYNAMIC ASSIGNMENT METHOD

(75) Inventors: Masayuki Yamamoto, Sagamihara (JP); Takayuki Nagai, Machida (JP); Masayasu Asano, Yokohama (JP); Yasunori Kaneda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/420,701

(22) Filed: Mar. 15, 2012

(65) Prior Publication Data

US 2012/0173839 A1    Jul. 5, 2012

Related U.S. Application Data

(63) Continuation of application No. 13/040,451, filed on Mar. 4, 2011, now Pat. No. 8,161,262, which is a continuation of application No. 12/549,582, filed on Aug. 28, 2009, now Pat. No. 7,917,722, which is a continuation of application No. 11/444,308, filed on Jun. 1, 2006, now Pat. No. 7,613,896.

(30) Foreign Application Priority Data

Apr. 12, 2006   (JP) ................. 2006-109323

(51) Int. Cl.
*G06F 12/02*    (2006.01)
(52) U.S. Cl. ........ 711/171; 711/161; 711/162; 711/165; 711/170; 711/173
(58) Field of Classification Search ............... 711/161, 711/162, 165, 170, 171, 203
See application file for complete search history.

(56) References Cited

U.S. PATENT DOCUMENTS

| | | | |
|---|---|---|---|
| 5,193,171 A | 3/1993 | Shinmura et al. | |
| 5,734,887 A | 3/1998 | Kingberg et al. | |
| 6,393,530 B1 * | 5/2002 | Greim et al. | 711/147 |
| 6,401,181 B1 | 6/2002 | Franaszek et al. | |
| 6,823,442 B1 | 11/2004 | Cameron | |
| 6,832,338 B2 * | 12/2004 | Casper et al. | 714/35 |
| 7,080,225 B1 | 7/2006 | Todd | |
| 7,246,161 B2 | 7/2007 | Fujita et al. | |
| 7,469,289 B2 | 12/2008 | Arakawa et al. | |
| 2002/0156988 A1 | 10/2002 | Toyama et al. | |
| 2003/0051111 A1 | 3/2003 | Nakano et al. | |
| 2003/0182505 A1 | 9/2003 | Don et al. | |
| 2003/0226058 A1 | 12/2003 | Miller et al. | |

(Continued)

FOREIGN PATENT DOCUMENTS

| | | |
|---|---|---|
| JP | 1096361 | 5/2001 |
| JP | 2003015915 | 1/2003 |

(Continued)

*Primary Examiner* — Jae Yu
(74) *Attorney, Agent, or Firm* — Brundidge & Stanger, P.C.

(57) ABSTRACT

A storage system allocates a data storage area in response to an access request from a first computer if the capacity of a first physical storage device configuring a first logical storage area, provided to the first computer, is equal to or lower than a predetermined threshold. The storage system associates the first logical storage area with another physical storage device, which is different from the first physical storage device associated with a second logical storage area provided to the first computer and a second computer, and allocates a data storage area from the another physical storage device if the capacity of the first physical storage device associated with the first logical storage area exceeds the predetermined threshold.

4 Claims, 32 Drawing Sheets

U.S. PATENT DOCUMENTS

| | | |
|---|---|---|
| 2004/0230766 A1 | 11/2004 | Cameron |
| 2005/0015475 A1 | 1/2005 | Fujita et al. |
| 2005/0055523 A1 | 3/2005 | Suishu et al. |
| 2005/0086432 A1 | 4/2005 | Sakai |
| 2005/0108496 A1* | 5/2005 | Elnozahy et al. ............ 711/203 |
| 2006/0155950 A1 | 7/2006 | Smith |
| 2007/0245116 A1 | 10/2007 | Yamamoto et al. |
| 2009/0319751 A1 | 12/2009 | Yamamoto et al. |
| 2010/0332745 A1 | 12/2010 | Kano et al. |
| 2011/0153967 A1 | 6/2011 | Yamamoto et al. |

FOREIGN PATENT DOCUMENTS

| | | |
|---|---|---|
| JP | 2003122509 | 4/2003 |
| JP | 2003316522 | 11/2003 |
| JP | 2005038071 | 2/2005 |
| JP | 200584953 | 3/2005 |

* cited by examiner

FIG.5A

|  22205  |  22210  |  22215  |
|---|---|---|
| REAL VOLUME ID | HOST ALLOCATION STATUS | CAPACITY |
| v001 | Unallocated | 10GB |
| v002 | Unallocated | 10GB |
| v003 | Unallocated | 10GB |

| 22305 | 22310 | 22315 | 22320 | 22325 |
|---|---|---|---|---|
| VIRTUAL VOLUME ID | HOST ALLOCATION STATUS | VIRTUAL CAPACITY | THRESHOLD | ASSIGNED CAPACITY |
| v101 | Allocated (PID=2, LUN=1) | 10GB | 6GB | 6GB |
| v102 | Allocated (PID=2, LUN=2) | 10GB | 6GB | 2GB |
| v103 | Allocated (PID=3, LUN=1) | 10GB | 6GB | 2GB |
| v104 | Allocated (PID=3, LUN=2) | 10GB | 6GB | 2GB |
| v105 | Allocated (PID=3, LUN=3) | 10GB | 6GB | 2GB |

| VOL ID (22505) | POOL (22510) | ASSIGNED LBA (22515) | ASSIGNED CHUNK (22520) |
|---|---|---|---|
| v101 | p1 | [0GB] - [2GB] | ch01 |
|  |  | [2GB] - [4GB] | ch02 |
|  |  | [4GB] - [6GB] | ch03 |
| v102 | p1 | [2GB] - [4GB] | ch04 |
| v103 | p1 | [0GB] - [2GB] | ch05 |
| v104 | p1 | [4GB] - [6GB] | ch06 |
| v105 | p1 | [0GB] - [2GB] | ch07 |

| POOL ID | CHUNK | POOLED VOLUME (ID, CAPACITY) | LBA | VIRTUAL VOLUME ALLOCATION STATUS |
|---|---|---|---|---|
| p1 | ch01 | (v201,10GB) | [0GB] - [2GB] | Allocated (v101) |
| | ch02 | | [2GB] - [4GB] | Allocated (v101) |
| | ch03 | | [4GB] - [6GB] | Allocated (v101) |
| | ch04 | | [6GB] - [8GB] | Allocated (v102) |
| | ch05 | | [8GB] - [10GB] | Allocated (v103) |
| | ch06 | (v202,10GB) | [0GB] - [2GB] | Allocated (v104) |
| | ch07 | | [2GB] - [4GB] | Allocated (v105) |
| | ch08 | | [4GB] - [6GB] | Unallocated |
| | ch09 | | [6GB] - [8GB] | Unallocated |
| | ch10 | | [8GB] - [10GB] | Unallocated |
| | ch11 | (v203,10GB) | [0GB] - [2GB] | Unallocated |
| | ch12 | | [2GB] - [4GB] | Unallocated |
| | ch13 | | [4GB] - [6GB] | Unallocated |
| | ch14 | | [6GB] - [8GB] | Unallocated |
| | ch15 | | [8GB] - [10GB] | Unallocated |

FIG.5E

| PG ID | ASSOCIATED HDD | USAGE | VOL ID |
|---|---|---|---|
| PG01 | a0,a1,a2,a3 | REAL VOLUME | v001 |
| PG02 | b0,b1,b2,b3 | REAL VOLUME | v002 |
| PG03 | c0,c1,c2,c3 | REAL VOLUME | v003 |
| PG04 | d0,d1,d2,d3 | POOLED VOLUME | v201 |
| PG05 | e0,e1,e2,e3 | POOLED VOLUME | v202 |
| PG06 | f0,f1,f2,f3 | POOLED VOLUME | v203 |

| SYSTEM ID | SYSTEM TYPE | SYSTEM INFORMATION | IP ADDRESS |
|---|---|---|---|
| ST1 | STORAGE | VENDOR A, MODEL A1, SERIAL NO. 10 | 10.10.10.10 |

| VIRTUAL VOLUME CREATION SCREEN | | | |
|---|---|---|---|
| STORAGE SYSTEM NAME : | ST1 | | ~90010 |
| VIRTUAL VOLUME INFORMATION : | | | |
| ASSIGNED PID : | p1 | | ~90015 |
| ASSIGNED LUN : | 1 | | ~90020 |
| CAPACITY : | 10 | GB | ~90025 |
| DATA MIGRATION THRESHOLD : | 60 | % | ~90030 |

90000

90040 — CREATE

FIG.10A

| REAL VOLUME ID (22205) | HOST ALLOCATION STATUS (22210) | CAPACITY (22215) |
|---|---|---|
| v001 | Allocated (PID=2, LUN=1) | 10GB |
| v002 | Unallocated | 10GB |
| v003 | Unallocated | 10GB |

| VIRTUAL VOLUME ID (22305) | HOST ALLOCATION STATUS (22310) | VIRTUAL CAPACITY (22315) | THRESHOLD (22320) | ASSIGNED CAPACITY (22325) |
|---|---|---|---|---|
| v101 | In Migration (to v001) | 10GB | 6GB | 6GB |
| v102 | Allocated (PID=2, LUN=2) | 10GB | 6GB | 2GB |
| v103 | Allocated (PID=3, LUN=1) | 10GB | 6GB | 2GB |
| v104 | Allocated (PID=3, LUN=2) | 10GB | 6GB | 2GB |
| v105 | Allocated (PID=3, LUN=3) | 10GB | 6GB | 2GB |

| VIRTUAL VOLUME ID | HOST ALLOCATION STATUS | VIRTUAL CAPACITY | THRESHOLD | ASSIGNED CAPACITY |
|---|---|---|---|---|
| v101 | In Migration (to v001) | 10GB | 6GB | 4GB |
| v102 | Allocated (PID=2, LUN=2) | 10GB | 6GB | 2GB |
| v103 | Allocated (PID=3, LUN=1) | 10GB | 6GB | 2GB |
| v104 | Allocated (PID=3, LUN=2) | 10GB | 6GB | 2GB |
| v105 | Allocated (PID=3, LUN=3) | 10GB | 6GB | 2GB |

| VOL ID | POOL | ASSIGNED LBA | ASSIGNED CHUNK |
|---|---|---|---|
| v101 | p1 | [0GB] - [2GB] | ch01 |
|  |  | [2GB] - [4GB] | ch02 |
| v102 | p1 | [2GB] - [4GB] | ch04 |
| v103 | p1 | [0GB] - [2GB] | ch05 |
| v104 | p1 | [4GB] - [6GB] | ch06 |
| v105 | p1 | [0GB] - [2GB] | ch07 |

| POOL ID (22605) | CHUNK (22610) | POOLED VOLUME (ID, CAPACITY) (22615) | LBA (22620) | VIRTUAL VOLUME ALLOCATION STATUS (22625) |
|---|---|---|---|---|
| p1 | ch01 | (v201,10GB) | [0GB] - [2GB] | Allocated (v101) |
| | ch02 | | [2GB] - [4GB] | Allocated (v101) |
| | ch03 | | [4GB] - [6GB] | *Unallocated* |
| | ch04 | | [6GB] - [8GB] | Allocated (v102) |
| | ch05 | | [8GB] - [10GB] | Allocated (v103) |
| | ch06 | (v202,10GB) | [0GB] - [2GB] | Allocated (v104) |
| | ch07 | | [2GB] - [4GB] | Allocated (v105) |
| | ch08 | | [4GB] - [6GB] | Unallocated |
| | ch09 | | [6GB] - [8GB] | Unallocated |
| | ch10 | | [8GB] - [10GB] | Unallocated |
| | ch11 | (v203,10GB) | [0GB] - [2GB] | Unallocated |
| | ch12 | | [2GB] - [4GB] | Unallocated |
| | ch13 | | [4GB] - [6GB] | Unallocated |
| | ch14 | | [6GB] - [8GB] | Unallocated |
| | ch15 | | [8GB] - [10GB] | Unallocated |

| VIRTUAL VOLUME ID | HOST ALLOCATION STATUS | VIRTUAL CAPACITY | THRESHOLD | ASSIGNED CAPACITY |
|---|---|---|---|---|
| v102 | Allocated (PID=2, LUN=2) | 10GB | 6GB | 2GB |
| v103 | Allocated (PID=3, LUN=1) | 10GB | 6GB | 2GB |
| v104 | Allocated (PID=3, LUN=2) | 10GB | 6GB | 2GB |
| v105 | Allocated (PID=3, LUN=3) | 10GB | 6GB | 2GB |

| VOL ID | POOL | ASSIGNED LBA | ASSIGNED CHUNK |
|---|---|---|---|
| v102 | p1 | [2GB] - [4GB] | ch04 |
| v103 | p1 | [0GB] - [2GB] | ch05 |
| v104 | p1 | [4GB] - [6GB] | ch06 |
| v105 | p1 | [0GB] - [2GB] | ch07 |

| 22605 | 22610 | 22615 | 22620 | 22625 |
|---|---|---|---|---|
| POOL ID | CHUNK | POOLED VOLUME (ID, CAPACITY) | LBA | VIRTUAL VOLUME ALLOCATION STATUS |
| p1 | ch01 | (v201, 10GB) | [0GB] - [2GB] | Unallocated |
|  | ch02 |  | [2GB] - [4GB] | Unallocated |
|  | ch03 |  | [4GB] - [6GB] | Unallocated |
|  | ch04 |  | [6GB] - [8GB] | Allocated (v102) |
|  | ch05 |  | [8GB] - [10GB] | Allocated (v103) |
|  | ch06 | (v202, 10GB) | [0GB] - [2GB] | Allocated (v104) |
|  | ch07 |  | [2GB] - [4GB] | Allocated (v105) |
|  | ch08 |  | [4GB] - [6GB] | Unallocated |
|  | ch09 |  | [6GB] - [8GB] | Unallocated |
|  | ch10 |  | [8GB] - [10GB] | Unallocated |
|  | ch11 | (v203, 10GB) | [0GB] - [2GB] | Unallocated |
|  | ch12 |  | [2GB] - [4GB] | Unallocated |
|  | ch13 |  | [4GB] - [6GB] | Unallocated |
|  | ch14 |  | [6GB] - [8GB] | Unallocated |
|  | ch15 |  | [8GB] - [10GB] | Unallocated |

| REAL VOLUME ID (22205) | HOST ALLOCATION STATUS (22210) | CAPACITY (22215) |
|---|---|---|
| v001 | Unallocated | 10GB |
| v002 | Unallocated | 10GB |
| v003 | Unallocated | 10GB |
| v203 | Allocated (PID=2, LUN=1) | 10GB |

| VIRTUAL VOLUME ID (22305) | HOST ALLOCATION STATUS (22310) | VIRTUAL CAPACITY (22315) | THRESHOLD (22320) | ASSIGNED CAPACITY (22325) |
|---|---|---|---|---|
| v102 | Allocated (PID=2, LUN=2) | 10GB | 6GB | 2GB |
| v103 | Allocated (PID=3, LUN=1) | 10GB | 6GB | 2GB |
| v104 | Allocated (PID=3, LUN=2) | 10GB | 6GB | 2GB |
| v105 | Allocated (PID=3, LUN=3) | 10GB | 6GB | 2GB |

| VOL ID | POOL | ASSIGNED LBA | ASSIGNED CHUNK |
|---|---|---|---|
| v102 | p1 | [2GB] - [4GB] | ch04 |
| v103 | p1 | [0GB] - [2GB] | ch05 |
| v104 | p1 | [4GB] - [6GB] | ch06 |
| v105 | p1 | [0GB] - [2GB] | ch07 |

| POOL ID | CHUNK | POOLED VOLUME (ID, CAPACITY) | LBA | VIRTUAL VOLUME ALLOCATION STATUS |
|---|---|---|---|---|
| p1 | ch01 | (v201,10GB) | [0GB] - [2GB] | Unallocated |
| | ch02 | | [2GB] - [4GB] | Unallocated |
| | ch03 | | [4GB] - [6GB] | Unallocated |
| | ch04 | | [6GB] - [8GB] | Allocated (v102) |
| | ch05 | | [8GB] - [10GB] | Allocated (v103) |
| | ch06 | (v202,10GB) | [0GB] - [2GB] | Allocated (v104) |
| | ch07 | | [2GB] - [4GB] | Allocated (v105) |
| | ch08 | | [4GB] - [6GB] | Unallocated |
| | ch09 | | [6GB] - [8GB] | Unallocated |
| | ch10 | | [8GB] - [10GB] | Unallocated |

22605 22610 22615 22620 22625 / 22600

| PG ID | ASSOCIATED HDD | USAGE | VOL ID |
|-------|----------------|---------------|--------|
| PG01  | a0,a1,a2,a3    | REAL VOLUME   | v001   |
| PG02  | b0,b1,b2,b3    | REAL VOLUME   | v002   |
| PG03  | c0,c1,c2,c3    | REAL VOLUME   | v003   |
| PG04  | d0,d1,d2,d3    | POOLED VOLUME | v201   |
| PG05  | e0,e1,e2,e3    | POOLED VOLUME | v202   |
| PG06  | f0,f1,f2,f3    | REAL VOLUME   | v203   |

| VOL ID | POOL | ASSIGNED LBA | ASSIGNED CHUNK |
|--------|------|--------------|----------------|
| v101   | p1   | [0GB] - [2GB] | ch01 |
|        |      | [2GB] - [4GB] | ch02 |
|        |      | [4GB] - [6GB] | ch03 |
| v102   | p1   | [2GB] - [4GB] | ch08 |
| v103   | p1   | [0GB] - [2GB] | ch09 |
| v104   | p1   | [4GB] - [6GB] | ch06 |
| v105   | p1   | [0GB] - [2GB] | ch07 |

| POOL ID | CHUNK | POOLED VOLUME (ID, CAPACITY) | LBA | VIRTUAL VOLUME ALLOCATION STATUS |
|---|---|---|---|---|
| p1 | ch01 | (v201,10GB) | [0GB] - [2GB] | Allocated (v101) |
| | ch02 | | [2GB] - [4GB] | Allocated (v101) |
| | ch03 | | [4GB] - [6GB] | Allocated (v101) |
| | ch04 | | [6GB] - [8GB] | Unallocated |
| | ch05 | | [8GB] - [10GB] | Unallocated |
| | ch06 | (v202,10GB) | [0GB] - [2GB] | Allocated (v104) |
| | ch07 | | [2GB] - [4GB] | Allocated (v105) |
| | ch08 | | [4GB] - [6GB] | *Allocated (v102)* |
| | ch09 | | [6GB] - [8GB] | *Allocated (v103)* |
| | ch10 | | [8GB] - [10GB] | Unallocated |
| | ch11 | (v203,10GB) | [0GB] - [2GB] | Unallocated |
| | ch12 | | [2GB] - [4GB] | Unallocated |
| | ch13 | | [4GB] - [6GB] | Unallocated |
| | ch14 | | [6GB] - [8GB] | Unallocated |
| | ch15 | | [8GB] - [10GB] | Unallocated |

| VOL ID (22505) | POOL (22510) | ASSIGNED LBA (22515) | ASSIGNED CHUNK (22520) |
|---|---|---|---|
| v101 | p2 | [0GB] - [2GB] | ch01 |
|  |  | [2GB] - [4GB] | ch02 |
|  |  | [4GB] - [6GB] | ch03 |
| v102 | p1 | [2GB] - [4GB] | ch08 |
| v103 | p1 | [0GB] - [2GB] | ch09 |
| v104 | p1 | [4GB] - [6GB] | ch06 |
| v105 | p1 | [0GB] - [2GB] | ch07 |

| POOL ID (22605) | CHUNK (22610) | POOLED VOLUME (ID, CAPACITY) (22615) | LBA (22620) | VIRTUAL VOLUME ALLOCATION STATUS (22625) |
|---|---|---|---|---|
| p2 | ch01 | (v201, 10GB) | [0GB] - [2GB] | Allocated (v101) |
| | ch02 | | [2GB] - [4GB] | Allocated (v101) |
| | ch03 | | [4GB] - [6GB] | Allocated (v101) |
| | ch04 | | [6GB] - [8GB] | Unallocated |
| | ch05 | | [8GB] - [10GB] | Unallocated |
| p1 | ch06 | (v202, 10GB) | [0GB] - [2GB] | Allocated (v104) |
| | ch07 | | [2GB] - [4GB] | Allocated (v105) |
| | ch08 | | [4GB] - [6GB] | Allocated (v102) |
| | ch09 | | [6GB] - [8GB] | Allocated (v103) |
| | ch10 | | [8GB] - [10GB] | Unallocated |
| | ch11 | (v203, 10GB) | [0GB] - [2GB] | Unallocated |
| | ch12 | | [2GB] - [4GB] | Unallocated |
| | ch13 | | [4GB] - [6GB] | Unallocated |
| | ch14 | | [6GB] - [8GB] | Unallocated |
| | ch15 | | [8GB] - [10GB] | Unallocated |

22600

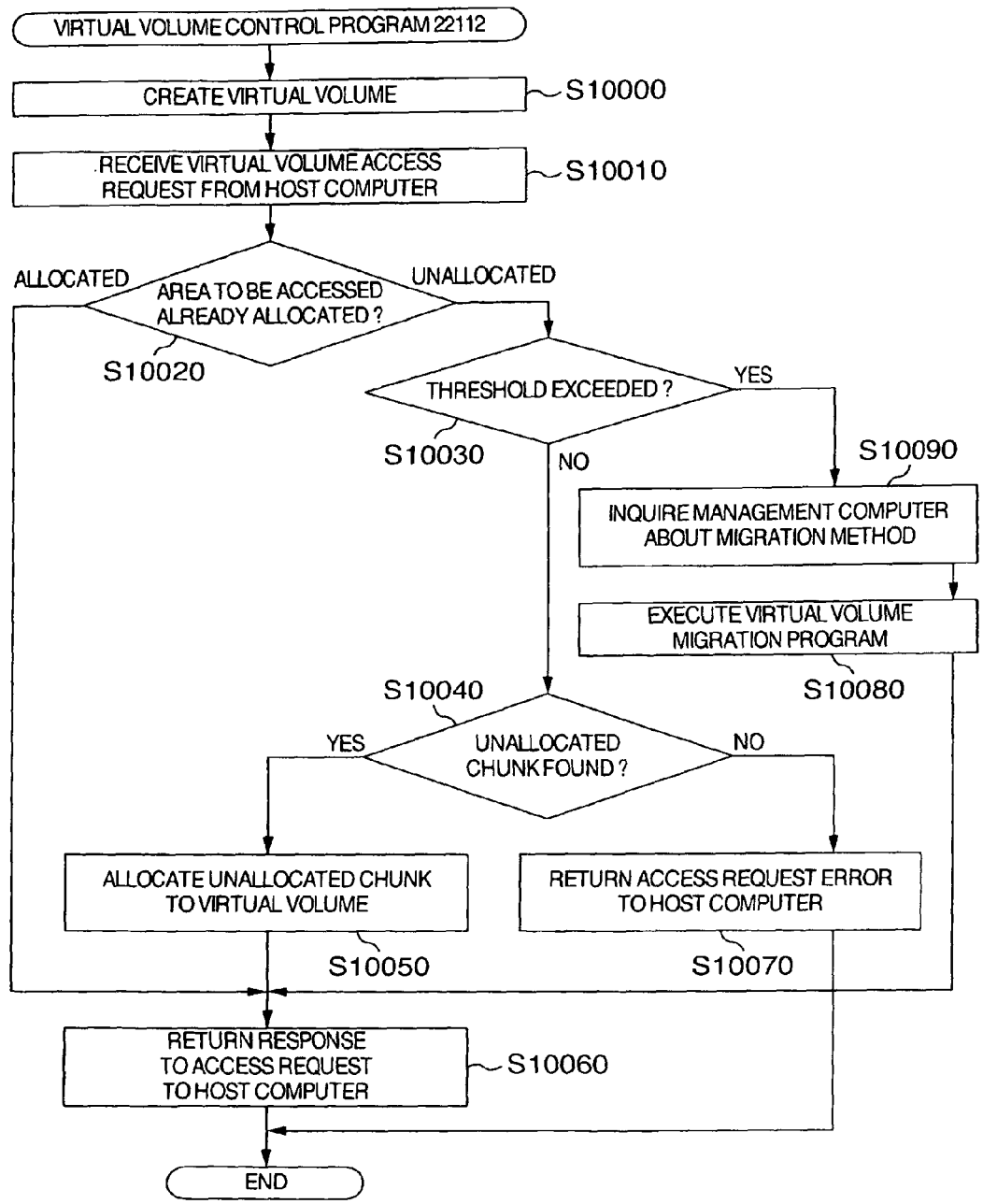

FIG.22A

VIRTUAL VOLUME CREATION SCREEN — 90000

| | |
|---|---|
| STORAGE SYSTEM NAME: | ST1 — 90010 |
| VIRTUAL VOLUME INFORMATION: | |
| ASSIGNED PID: | p1 — 90015 |
| ASSIGNED LUN: | 1 — 90020 |
| CAPACITY: | 10 GB — 90025 |
| THRESHOLD: | 60 % — 90030 |
| MIGRATION METHOD: | MIGRATE TO REAL VOLUME — 90035 |

90040 — CREATE

FIG.22B

| STORAGE SYSTEM (43205) | VIRTUAL VOLUME ID (43210) | MIGRATION METHOD (43215) |
|---|---|---|
| ST1 | v102 | MIGRATE TO REAL VOLUME |
| ST1 | v103 | DIVIDE POOL |

VIRTUAL VOLUME CREATION SCREEN ~90000

| | | |
|---|---|---|
| STORAGE SYSTEM NAME: | ST1 | ~90010 |
| VIRTUAL VOLUME INFORMATION: | | |
| ASSIGNED PID: | p1 | ~90015 |
| ASSIGNED LUN: | 1 | ~90020 |
| CAPACITY: | 10 | GB ~90025 |
| THRESHOLD: | 60 | % ~90030 |
| MIGRATION METHOD: | PRIORITY ON REAL VOLUME | ~90035 |

90040 ~ [CREATE]

FIG.24B

| STORAGE SYSTEM (43205) | VIRTUAL VOLUME ID (43210) | MIGRATION METHOD (43215) |
|---|---|---|
| ST1 | v102 | PRIORITY ON REAL VOLUME |
| ST1 | v103 | PRIORITY ON POOLED VOLUME |

43200

STORAGE AREA DYNAMIC ASSIGNMENT METHOD

INCORPORATION BY REFERENCE

The present application is a continuation of application Ser. No. 13/040,451, filed Mar. 3, 2011 now U.S. Pat. No. 8,161,262; which is a continuation of application Ser. No. 12/549,582, filed Aug. 28, 2009, now U.S. Pat. No. 7,917,722; which is a continuation of application Ser. No. 11/444,308, filed Jun. 1, 2006, now U.S. Pat. No. 7,613,896; which claims priority from Japanese application JP 2006-109323 filed on Apr. 12, 2006, the content of which is hereby incorporated by reference into this application.

BACKGROUND OF THE INVENTION

The present invention relates to a storage system used in a computer system. More particularly, the present invention relates to a method for extending the volume capacity when data is written from a host computer to a storage system.

In general, a computer system is composed of a host computer that performs operations and a storage system that reads and writes data according to instructions from the host computer. The storage system provides multiple volumes to and from which data is stored and read.

An increase in the amount of data written by a host computer requires an increase in the capacity of the volumes allocated to that host computer. This is called the extension of the volume capacity.

An example of the volume capacity extension method is that a storage administrator stops the operation of a host computer, extends the capacity, and restarts the operation of the host computer. The problem with this method is that the operation of the host computer must be once stopped and, therefore, the operation is interrupted.

U.S. Pat. No. 6,823,442 discloses a volume capacity automatic extension technology for use in a storage system. The volume capacity automatic extension technology is a technology in which a storage area pool is prepared in the storage system and a volume created from this storage area pool, which shows a virtual capacity to the host computer, is used to allocate a necessary storage area according to data written by the host computer.

SUMMARY OF THE INVENTION

The volume capacity automatic extension technology increases the volume capacity usage ratio as more and more volumes are provided from one storage area pool to a host computer. However, in case where a large amount of the storage area is allocated to a specific volume, the amount of the storage area in the storage area pool available for other volumes is reduced.

In view of the foregoing, U.S. Pat. No. 6,823,442 discloses a threshold, which indicates that "no more storage area is allocated" to a volume. More specifically, if a necessary storage area is allocated from the storage area pool when a host computer writes data to a volume, the storage system references this threshold and, if the threshold is exceeded, responds with an error to the write request from the host computer. The storage system allocates no storage area from the storage area pool when it responds with an error.

As described above, the threshold has an effect of suppressing a reduction in the amount of storage area in the storage area pool. However, because the host computer operation is once stopped when the threshold is exceeded, the operation is interrupted.

In the present invention, a storage system connected to a first computer and a second computer associates a first logical storage area and a second logical storage area, configured by a first physical storage device in the storage system, with a first computer and a second computer, respectively, and provides those logical storage areas. If the capacity of the first physical storage device associated with the first logical storage area is equal to or lower than a predetermined threshold, the storage system allocates a data storage area in response to an access request from the first computer. If the capacity of the first physical storage device associated with the first logical storage area exceeds the predetermined threshold, the storage system associates the first logical storage area with another physical storage device, which is different from the first physical storage device associated with the first and second logical storage areas, and allocates a data storage area from the another physical storage device.

For example, the first physical storage device is a storage area pool (hereinafter called "volume pool for virtual volumes"). The storage system allocates storage areas to logical volumes (hereinafter called "virtual volumes"), provided to the first and second computers, from the volume pool for virtual volumes.

When multiple host computers use storage areas in a storage system, the method according to the present invention allows the host computers to continue operation and prevents the processing performance of the storage system from being reduced.

Other objects, features and advantages of the invention will become apparent from the following description of the embodiments of the invention taken in conjunction with the accompanying drawings.

BRIEF DESCRIPTION OF THE DRAWINGS

FIG. 5A is a diagram showing an example of a real volume table in the first embodiment.

FIG. 5B is a diagram showing an example of a virtual volume table in the first embodiment.

FIG. 5C is a diagram showing an example of a virtual volume addressing table in the first embodiment.

FIG. 5D is a diagram showing an example of a volume pool table for virtual volumes in the first embodiment.

FIG. 5E is a diagram showing an example of a parity group table in the first embodiment.

FIG. 6 is a diagram showing an example of a table provided in the management computer in the first embodiment.

FIG. 8 is a diagram showing an example of a virtual volume creation screen in the first embodiment.

FIG. 10A is a diagram showing an example of the real volume table placed in the migration state in the first embodiment.

FIG. 10B is a diagram showing an example of the virtual volume table placed in the migration state in the first embodiment.

FIG. 11A is a diagram showing an example of the virtual volume table while data is migrated in the first embodiment.

FIG. 11B is a diagram showing an example of the virtual volume addressing table while data is migrated in the first embodiment.

FIG. 11C is a diagram showing an example of the volume pool table for virtual volumes while data is migrated in the first embodiment.

FIG. 12A is a diagram showing an example of the virtual volume table after data is migrated in the first embodiment.

FIG. 12B is a diagram showing an example of the virtual volume addressing table after data is migrated in the first embodiment.

FIG. 12C is a diagram showing an example of the volume pool table for virtual volumes after data is migrated in the first embodiment.

FIG. 14A is a diagram showing an example of the real volume table in the first modification of the first embodiment.

FIG. 14B is a diagram showing an example of the virtual volume table in the first modification of the first embodiment.

FIG. 14C is a diagram showing an example of the virtual volume addressing table in the first modification of the first embodiment.

FIG. 14D is a diagram showing an example of the volume pool table for virtual volumes in the first modification of the first embodiment.

FIG. 16A is a diagram showing an example of the virtual volume addressing table after data is migrated in the second modification of the first embodiment.

FIG. 16B is a diagram showing an example of the volume pool table for virtual volumes after data is migrated in the second modification of the first embodiment.

FIG. 17A is a diagram showing an example of the virtual volume addressing table after a pool is divided in the second modification of the first embodiment.

FIG. 17B is a diagram showing an example of the volume pool table for virtual volumes after a pool is divided in the second modification of the first embodiment.

FIG. 21 is a flowchart of a virtual volume control program in the second embodiment.

FIG. 22A is a diagram showing an example of a virtual volume creation screen in the second embodiment.

FIG. 22B is a diagram showing an example of a virtual volume migration method management table in the second embodiment.

FIG. 24A is a diagram showing an example of the virtual volume creation screen in a first modification of the second embodiment.

FIG. 24B is a diagram showing an example of the virtual volume migration method management table in the first modification of the second embodiment.

DETAILED DESCRIPTION OF THE EMBODIMENTS

Embodiments of the present invention will be described in detail with reference to the drawings. It should be noted that the present invention is not limited to those embodiments.

First Embodiment

In a first embodiment, a storage system has a virtual volume migration program therein and, in case where a large amount of storage area is allocated to a specific virtual volume, the storage system migrates data to an unused volume when the threshold is exceeded. The following describes this method.

First, the following describes the configuration of a computer system in the first embodiment. FIG. 1 to FIG. 4 show the configuration of the computer system and the configuration of the devices connected to the computer system. FIG. 5 to FIG. 6 show the management information provided in the devices.

Figure 1:
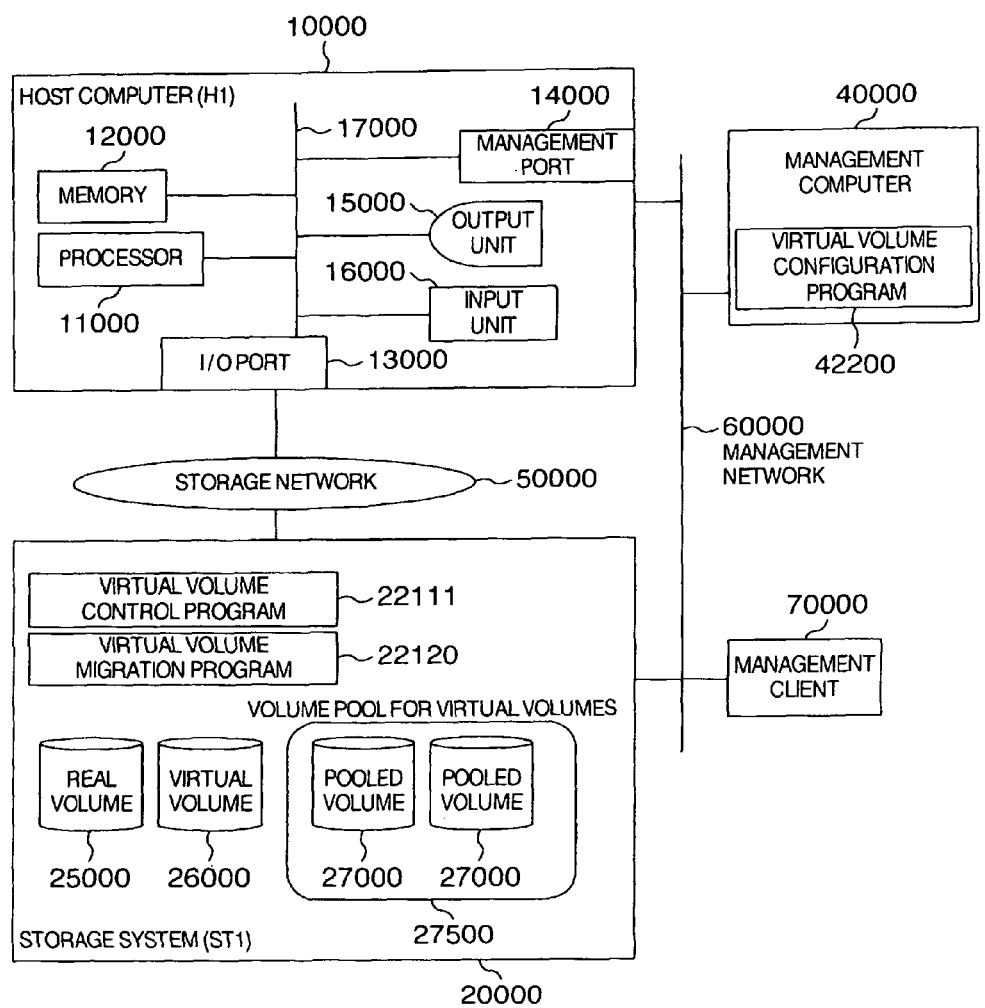
FIG. 1 is a diagram showing an example of the configuration of a computer system in a first embodiment.

FIG. 1 shows the configuration of a computer system in the first embodiment. The system comprises one or more host computers 10000 and one or more storage systems 20000 that are interconnected via a storage network 50000.

The host computer 10000 comprises a processor 11000, a memory 12000, one or more I/O ports 13000 for connection to the storage network 50000, a management port 14000 for connection to a management network 60000, an output unit 15000 such as a display device for outputting processing results, and an input unit 16000 such as a keyboard and a mouse. Those components are interconnected via an internal bus 17000. The memory 12000 stores the OS (not shown) and applications (not shown) that perform processing which involves an access to data stored in the storage system. The programs are read from a storage medium (not shown), such as a hard disk, for execution by the processor 11000.

The storage system 20000 comprises a virtual volume control program 22111, a virtual volume migration program 22120, real volumes 25000, virtual volumes 26000, pooled volumes 27000, and a volume pool for virtual volumes 27500. The detailed configuration will be described later.

A management computer 40000 comprises a virtual volume configuration program 42200. The detail will be described later.

A management client 70000 will be described later.

For convenience of description, assume that a host computer H1 is connected to a storage system ST1 via the storage network in the first embodiment. Also assume that the storage network 50000 is a network using the FC (Fibre Channel) protocol and that the management network 60000 is a network using the TCP/IP protocol.

Figure 2:
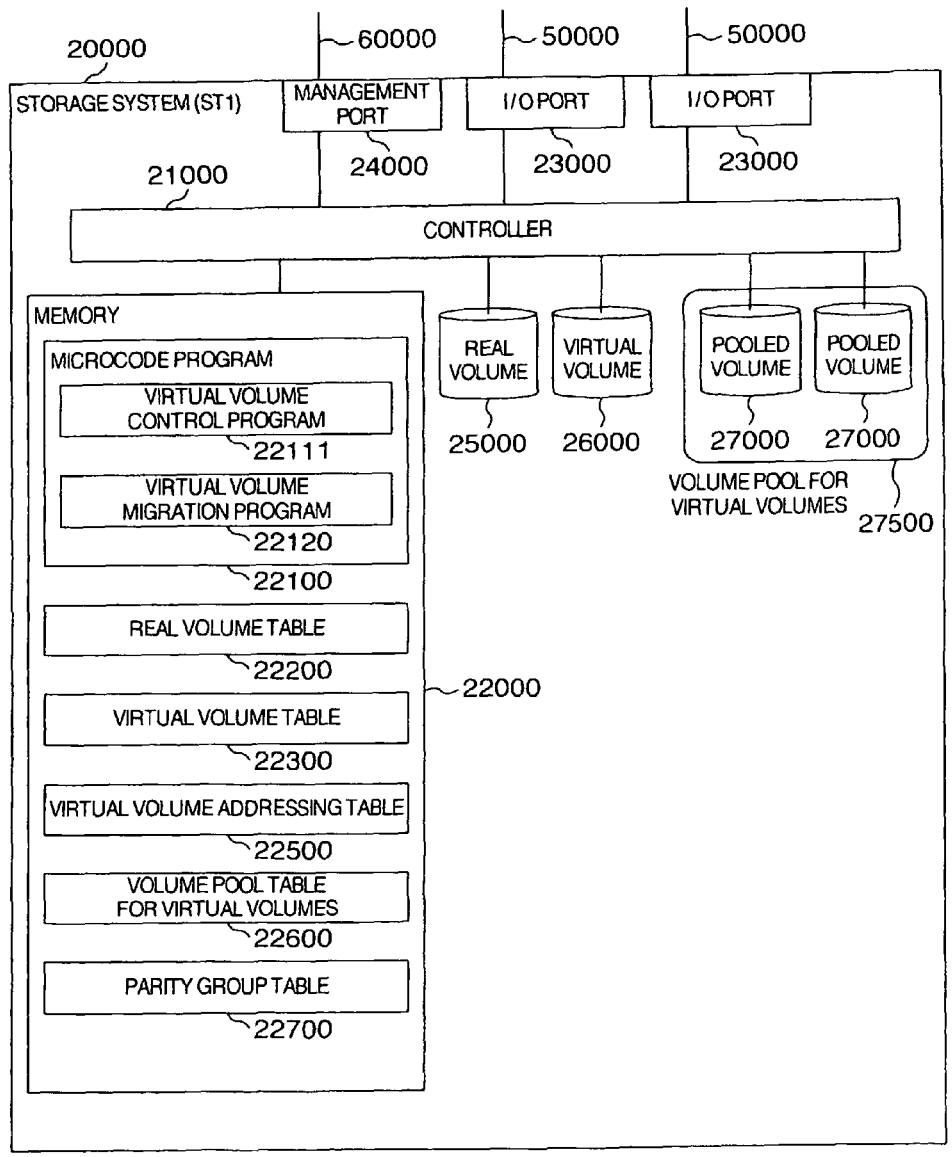
FIG. 2 is a diagram showing an example of the configuration of a storage system in the first embodiment.

FIG. 2 shows an example of the detailed configuration of the storage system 20000. The storage system 20000 comprises a controller 21000 that controls the storage system, a memory 22000, one or more I/O ports 23000 for connection to the storage network 50000, one or more real volumes 25000 provided to the host computer as a storage area, one or more virtual volumes 26000 provided to the host computer as a storage area, one or more pooled volumes 27000 that constitute a storage area in which data is stored for providing virtual volumes, and a volume pool for virtual volumes 27500 composed of one or more pooled volumes and defining the range of pooled volumes that provide a storage area to a virtual volume. Those components are interconnected via the controller 21000.

Figure 26:
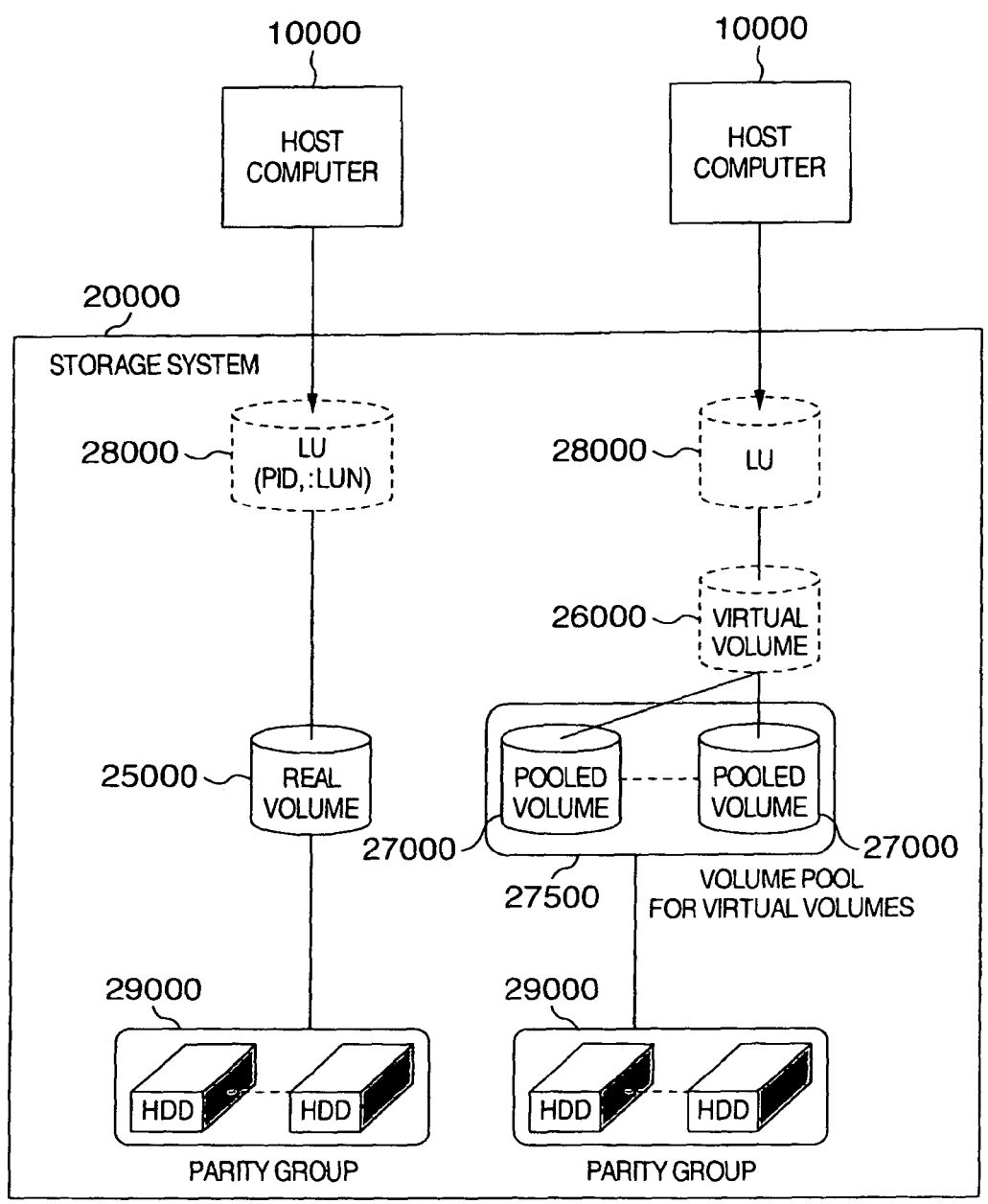
FIG. 26 is a diagram showing the concept of an LU, a real volume, a virtual volume, a pooled volume, and a parity group in the embodiment.

Now, with reference to FIG. 26, the following describes the difference among the real volume 25000, the virtual volume 26000, and the pooled volume 27000. Based on a SCSI port ID (hereinafter abbreviated to "PID") assigned to an I/O port of the storage system and an SCSI LU number (hereinafter abbreviated to "LUN") assigned to a logical unit (hereinafter abbreviated to "LU" (Logical Unit)) that is a logical storage area, the host computer 10000 accesses an LU 28000 for reading or writing data. The LU 28000 may be set for each host computer 10000. The LU 28000 may also be set for each application used by the host computer 10000.

The storage system 20000 associates this LU 28000 with the real volume 25000 or the virtual volume 26000 and stores data, which is read or written by the host computer 10000, in the real volume 25000 or the virtual volume 26000.

When the real volume 25000 is associated with the LU 28000, the storage system 20000 stores data either in a RAID composed of multiple hard disks installed in the storage system, or in a physical storage area composed of one hard disk, with which the real volume 25000 is associated. In this embodiment, assume that the real volume 25000 is configured as a RAID composed of multiple hard disks (hereinafter called HDD), called a parity group 29000, installed in the storage system.

When the LU 28000 is associated with the virtual volume 26000, the storage system 20000 uses the technology disclosed in U.S. Pat. No. 6,823,442 to allocate a necessary storage area according to the amount of data written by the host computer 10000. First, the storage system 20000 associates the virtual volume 26000 with the storage area of one or more pooled volumes 27000 belonging to the volume pool for virtual volumes 27500 that provides storage areas to the virtual volume. In addition, the storage system 20000 associates the pooled volumes 27000 either with a physical storage area in a RAID composed of multiple hard disks installed in the storage system or with a physical storage area composed of one hard disk and then stores data therein. In this embodiment, assume that the pooled volume 27000 is configured in the same way as the real volume 25000; that is it is configured as a RAID composed of multiple hard disks (HDD), called the parity group 29000, installed in the storage system.

As will be described later, a real volume table 22200 prepared in the storage system 20000 is a table for managing the correspondence between the LU 28000 and the real volumes 25000. A virtual volume table 22300 is a table for managing the correspondence between the LU 28000 and the virtual volumes 26000. A virtual volume addressing table 22500 is a table for managing the correspondence between the virtual volumes 26000 and the pooled volumes 27000. A volume pool table for virtual volumes 22600 is a table for managing the correspondence between the pooled volumes 27000 and the volume pool for virtual volumes 27500. A parity group table 22700 is a table for managing the correspondence between the real volumes 25000, pooled volumes 27000, and the parity groups 29000.

Returning to the description of FIG. 2, the memory 22000 stores microcode programs 22100 executed by the controller for controlling the storage system. The microcode program 22100 includes the virtual volume control program 22111 and the virtual volume migration program 22120 that will be described later. The general operation of the virtual volume control program 22111 will be described later. The memory 22000 also stores the real volume table 22200 that manages the real volumes 25000 in the storage system, the virtual volume table 22300 that manages the virtual volumes 26000, the virtual volume addressing table 22500 referenced by the virtual volume control program 22111 and indicating where data stored in a virtual volume is located in the pooled volumes, the volume pool table for virtual volumes 22600 referenced by the virtual volume control program 22111 and indicating the configuration of pooled volumes constituting a volume pool for virtual volumes, and a parity group table 22700 indicating which parity group 29000 constitutes the real volume 25000 or pooled volume 27000 in the storage system. Those tables and programs are read from a storage medium (not shown), such as a hard disk, when the storage system is started.

This embodiment may be applied to a configuration with any number of I/O ports 23000 and any number and amount of real volumes 25000, virtual volumes 26000, pooled volumes 27000, and volume pools for virtual volumes 27500.

Figure 3:
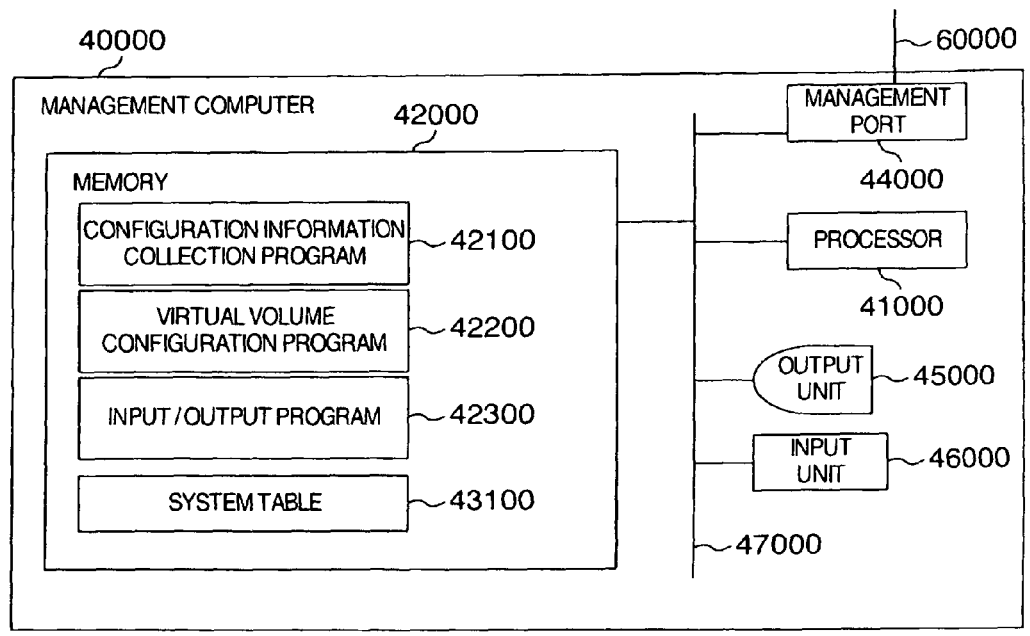
FIG. 3 is a diagram showing an example of the configuration of a management computer in the first embodiment.

FIG. 3 shows an example of the configuration of the management computer in the first embodiment.

The management computer 40000 comprises a processor 41000, a memory 42000, a management port 44000 for connection to the management network 60000, an output unit 45000 such as a display for outputting processing results, and an input unit 46000 such as a keyboard and a mouse. Those components are interconnected via an internal bus 47000. The memory 42000 stores a configuration information collection program 42100 (detailed flow not shown) for executing the collection of configuration information and the configuration setting of the storage system 20000, the virtual volume configuration management program 42200 (detailed flow not shown) for executing the setting of virtual volumes, an input/output program 42300 (detailed flow not shown) for communicating with the input unit 46000 and the output unit 45000 of the management computer 40000 and with the management client 70000 for executing the input/output of the virtual volume configuration management program, and a system table 43100 for allowing the management computer 40000 to identify the host computer 10000 and the storage system 20000 to be managed. Those programs and tables are implemented when the processor 41000 reads them from the storage medium (not shown), such as a hard disk, into the memory 42000 for execution. Although not shown, the OS (Operating System) is read from a storage medium into the memory 42000 for execution by the processor 41000.

Figure 4:
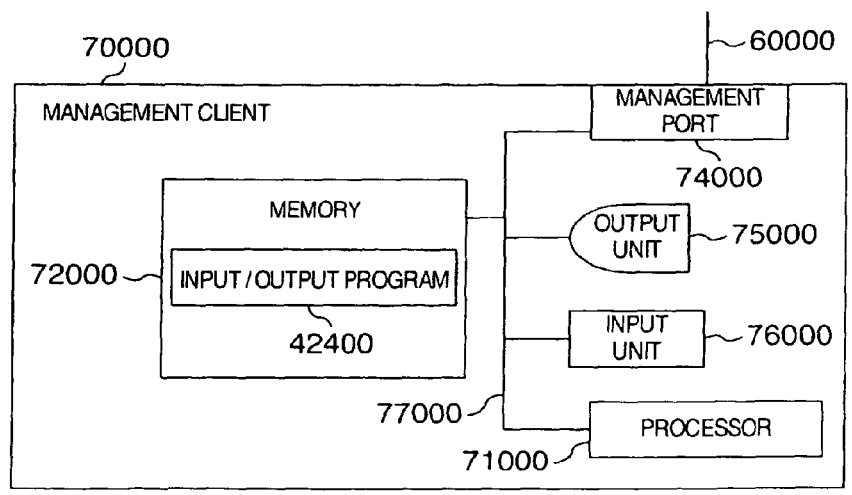
FIG. 4 is a diagram showing an example of the configuration of a management client in the first embodiment.

FIG. 4 shows an example of the configuration of the management client in the first embodiment.

The management client 70000 comprises a processor 71000, a memory 72000, a management port 74000 for connection to the management network 60000, an output unit 75000 such as a display for outputting processing results, and an input unit 76000 such as a keyboard and a mouse. Those components are interconnected via an internal bus 77000. The memory 72000 stores an input/output program 42400 that controls the input/output operation for remotely executing a program on the management computer 40000. This program is implemented when the processor 71000 reads it from a storage medium (not shown), such as a hard disk, into the memory 72000 for execution. Although not shown in the figure, the OS (Operating System) is read from a storage medium (not shown), such as a hard disk, into the memory 72000 for execution by the processor 71000.

FIG. 5 shows an example of the tables stored in the storage system in the first embodiment.

FIG. 5A shows an example of the real volume table 22200 for managing the real volumes 25000 in the storage system. The real volume table 22200 is composed of a real volume ID 22205 in which a real volume ID, which is the unique identifier of a real volume in the storage system, is registered, a host allocation status 22210 indicating the status of allocation of the real volume to the host computer, and a capacity 22215 indicating the capacity of the real volume. There are two values for the host allocation status 22210: "Allocated" indicating that the real volume is allocated to the host computer and "Unallocated" indicating that the real volume is not allocated to the host computer. For the "Allocated" status, the PID that is the ID of the I/O port 23000 and the LUN that is the SCSI LU number are also stored to allow the host computer to access this table.

FIG. 5B shows an example of the virtual volume table 22300 for managing the virtual volumes 26000 in the storage system. The virtual volume table 22300 is composed of a virtual volume ID 22305 in which a virtual volume ID, which is the unique identifier of a virtual volume in the storage system, is registered, a host allocation status 22310 indicating the status of allocation of the virtual volume to the host computer, a virtual capacity 22315 indicating the capacity of the virtual volume, a threshold 22320 indicating a threshold that will be described later, and an assigned capacity 22325 indicating the capacity of storage areas actually allocated to the virtual volume. The meanings of the values of the host allocation status 22310 are the same as those in FIG. 5A and therefore their description is omitted.

FIG. 5C shows an example of the virtual volume addressing table 22500 referenced by the virtual volume control program 22111 and indicating the location of data, stored in a virtual volume, within pooled volumes. The virtual volume addressing table 22500 is composed of a volume ID 22505 in which the ID of a virtual volume is registered, a pool 22510 in which a pool ID, which indicates identification information on the volume pool for virtual volumes used by the virtual volume to store data and which is a unique identifier of a volume pool for virtual volumes in the storage system, is registered, an assigned LBA 22515 in which the logical block address (Logical Block Address, hereinafter called LBA) of a storage area, which is a part of the storage area space provided by this virtual volume to the host computer and to which a storage area is actually assigned, is registered, and an assigned chunk 22520, in which an identifier is stored that uniquely identifies, in the storage system, the assigned storage area (hereinafter called a chunk) corresponding to the LBA. The symbol [xGB] in the assigned LBA 22515 is defined as a symbol indicating the xGBth address from the start of a volume.

The following describes the meaning of the records in FIG. 5C with the record, which includes v102 in the volume ID 22505, as an example. This record indicates that the chunk ch04, to or from which data is written or read, is allocated to an 2 GB storage area, beginning at the address 2 GB from the start and ending at the address 4 GB from the start, of the virtual volume v102.

FIG. 5D shows an example of the volume pool table for virtual volumes 22600 referenced by the virtual volume control program 22111 and indicating the configuration of pooled volumes that configure a volume pool for virtual volumes. The volume pool table for virtual volumes 22600 is composed of a pool ID 22605 in which a pool ID is registered, a chunk 22610 in which the chunk ID of a chunk belonging to the volume pool for virtual volumes is registered, a pooled volume 22615 in which a pooled volume ID, which indicates a pooled volume providing a storage area corresponding to the chunk and which is a unique pooled volume identifier in the storage system, is registered, an LBA 22620 that indicates the correspondence between a storage area space provided by the pooled volume to the volume pool for virtual volumes and the chunk, and a virtual volume allocation status 22625 that indicates the status of allocation of the chunk to the virtual volume. The pooled volume 22615 also stores the capacity information on the pooled volume. The virtual volume allocation status 22625 has two types of status: "Allocated" status indicating that the chunk is allocated to the virtual volume and "Unallocated" status indicating that the chunk is not allocated to the virtual volume. For the "Allocated" status, the value of the virtual volume ID indicating to which virtual volume the chunk is allocated is also stored. The meaning of the symbol [xGB] in the LBA 22620 is the same as that in FIG. 5C.

The following describes the meaning of the records in FIG. 5D with the record, which includes ch01 in the chunk 22610, as an example. This record indicates that the chunk ch01 is composed of a 2 GB storage area, beginning at the address 0 GB from the start of the 10 GB pooled volume v201 and ending at the address 2 GB from the start, and that the chunk ch01 is allocated to the virtual volume v101.

FIG. 5E shows an example of the parity group table 22700 that indicates which parity group 29000 configures the real volumes 25000 and the pooled volumes 27000 in the storage system. The parity group table 22700 is composed of a parity group ID (abbreviated to PG ID) 22705 in which a parity group ID that is the unique identifier of one of the parity groups 29000 in the storage system 20000 is registered, an associated HDD 22710 in which multiple hard disks (abbreviated to HDD) configuring a RAID is registered, a usage 22715 in which a value indicating whether the volumes configured as the parity group is to be used as a "real volume" or a "pooled volume" is registered, and a volume ID 22720 in which the ID of the volume configured by the parity group is registered.

The following describes the meaning of the records in FIG. 5E with the record, which includes PG01 in the parity group ID 22705, as an example. This record indicates that PG01 is a parity group that can configure a real volume configured by the RAID of four HDDs a0, a1, a2, and a3 and that the real volume v001 is defined.

FIG. 6 shows an example of the system table included in the management computer 40000.

The system table 43100 is used to identify the storage system 20000 to be processed by the virtual volume configuration program in the management computer 40000. This table is composed of a system ID 43110 in which a system ID for uniquely identifying a system in the computer system is registered, a system type 43120 in which the type of the system is registered, system information 43130 in which detailed information on the system such as the vendor name, model name, and serial number of the system is registered, and an IP address 43140 in which the IP address used for communication with the management port of the system is registered. The information may also be registered in advance by the system administrator via the management computer 40000 or the management client 70000. The information may also be created automatically using the name service on the storage network or management network.

The configuration of the computer system in the first embodiment is as described above.

Next, the following describes the general operation of the storage system in the first embodiment with focus on virtual volume data access processing and the virtual volume migration processing involved in the virtual volume data access processing.

The data access processing and the virtual volume migration processing are implemented when the controller 21000 in the storage system 20000 executes the virtual volume control program 22111 and the virtual volume migration program 22120 respectively. The following gives the description of the operation of the controller 21000 when the virtual volume control program 22111 is executed followed by the description of the operation of the controller 21000 when the virtual volume migration program 22120 is executed.

Figure 7:
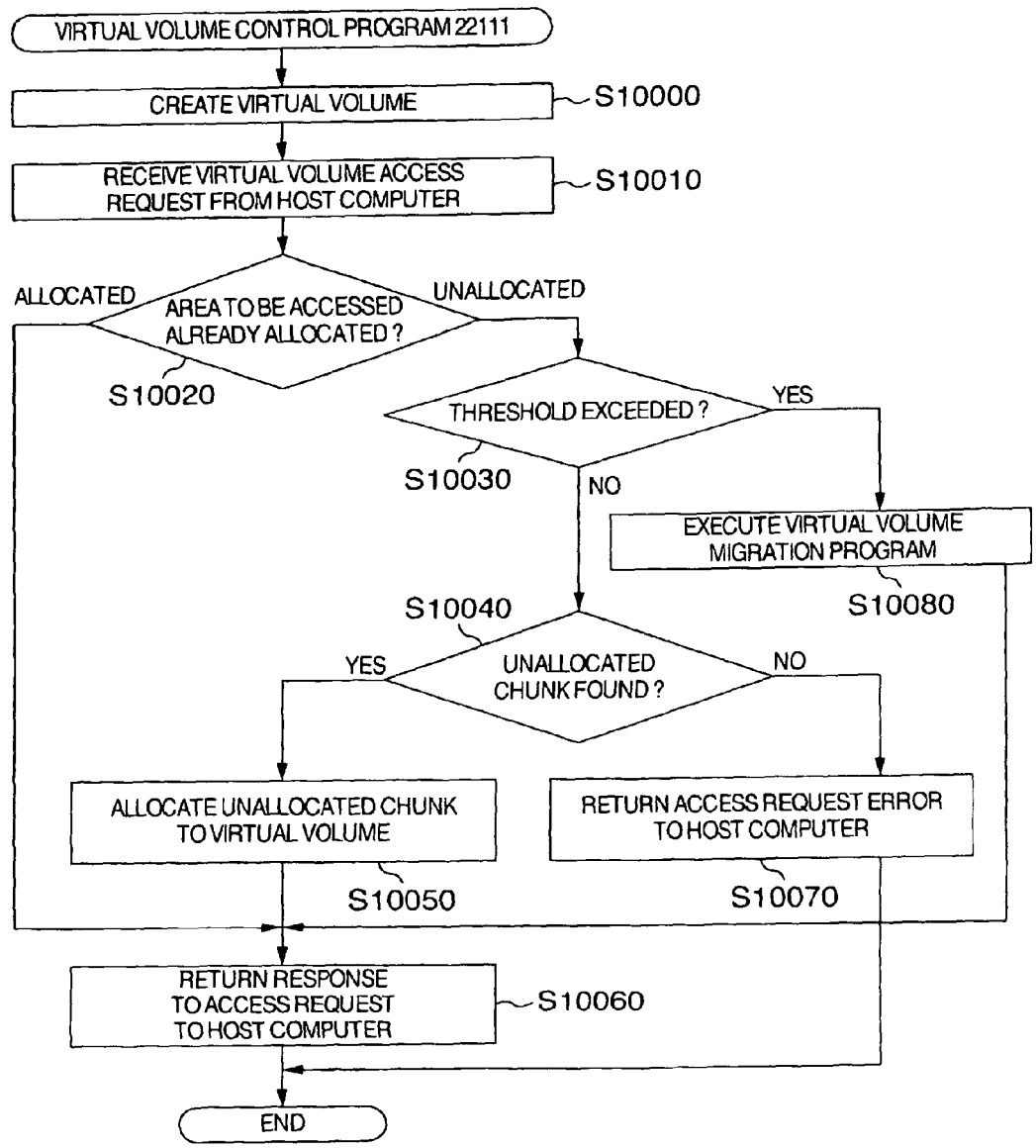
FIG. 7 is a flowchart of a virtual volume control program in the first embodiment.

FIG. 7 is a flowchart showing the operation of the controller 21000 in the first embodiment when the virtual volume control program 22111 is executed.

First, the controller 21000 creates virtual volumes (step S10000).

Now, turning to FIG. 8, the following describes an example of virtual volume creation. The processor 41000 of the management computer 40000 executes the input/output program to display a virtual volume creation screen 90000 such as the one shown in FIG. 8. The virtual volume creation screen 90000 has a system entry field 90010 in which the name of a storage system where a virtual volume is to be created is entered, a PID entry field 90015 in which the PID that is the ID of the I/O port 23000 is entered to allow the host computer to access the virtual volume, a LUN entry field 90020 in which a LUN that is a SCSI LU number is entered, a capacity entry field 90025 in which the virtual capacity of the virtual volume is entered, a threshold entry field 90030 in which a data migration threshold that will be described later is entered, and a creation button 90040 used to send a virtual volume creation request to the storage system based on the values entered in the system entry field 90010, PID entry field 90015, LUN entry field 90020, capacity entry field 90025, and threshold entry field 90030.

The storage administrator fills in all those entry fields and presses the button. For example, if the storage administrator enters the parameters shown in FIG. 8 to create a virtual volume, the processor 41000 of the management computer 40000 creates a virtual volume in the storage system ST1 where the virtual capacity is 10 GB, the data migration threshold is 6 GB that is 60% of the virtual capacity, the PID of the system in which the virtual volume is allocated is p1, and the LUN of the system in which the virtual volume is allocated is 1.

Returning to the description of step S10000 in FIG. 7, the controller 21000 of the storage system 20000 receives the virtual volume creation request, including the setting information such as the virtual volume capacity, the host computer to which the virtual volume is allocated, and the threshold indicating the maximum allowable chunk allocation, from the management computer and creates a virtual volume according to the virtual volume creation request.

The controller 21000 of the storage system 20000 executes this step S10000 when a virtual volume is created. The controller 21000 of the storage system 20000 executes the step S10010 and the subsequent steps each time a virtual volume access request is generated from the host computer.

Next, the controller 21000 receives a virtual volume access request from the host computer. More specifically, the controller 21000 receives a virtual volume data read/write SCSI command issued by the host computer. This access request includes information on the virtual volume and the LBA to or from which data is to be written or read (step S10010).

Next, the controller 21000 checks if the storage area requested by the access request received in step S10010 is already allocated. If the access request is a read request, the controller 21000 judges that the storage area requested by the access request is already allocated. If the access request is a write request, the controller 21000 checks the information on the write-to virtual volume and the LBA included in the access request received in step S100010 to see if the LBA entry of the virtual volume is included in the virtual volume addressing table 22500 (step S10020).

If the LBA entry of the virtual volume is found in step S10020, the storage area is already allocated and, so, the controller 21000 passes control to step S10060.

If the LBA entry of the virtual volume is not found in step S10020, the storage area is not allocated and therefore the controller 21000 checks if the threshold for virtual volume migration program execution is exceeded. More specifically, if the total capacity, generated by adding the capacity of a newly allocated chunk to the assigned capacity 22325, does not exceed the threshold 22320, the controller 21000 determines that the threshold is not exceeded and passes control to step S10040. If the total capacity exceeds the threshold 22320, the controller 21000 determines that the threshold is exceeded and passes control to step S10080 (step S10030).

If the threshold 22320 is exceeded in step S10030, the controller 21000 executes the virtual volume migration program 22120 to migrate the virtual volume data (step S10080) and passes control to step S10060. The virtual volume migration program 22120 will be described later in detail.

If the total capacity does not exceed the threshold in step S10030, the controller 21000 checks if the volume pool for virtual volumes includes unallocated chunks. More specifically, the controller 21000 checks the pool 22510 in the entry of the access-requested virtual volume in the virtual volume addressing table 22500 to see in which volume pool for virtual volumes the virtual volume stores data. Next, based on the ID of the volume pool for virtual volumes, the controller 21000 checks the virtual volume allocation status 22625 of the chunk entries registered in the volume pool table for virtual volumes 22600 and searches for a chunk not allocated to any virtual volume (step S10040).

If a chunk unallocated to a virtual volume is not found in step S10040, all storage areas in the volume pool for virtual volumes are allocated and, therefore, the controller 21000 returns an error response to the access request, received in step S10010, to the host computer (step S10070) and terminates the program.

If a chunk unallocated to a virtual volume is found in step S10040, the controller 21000 allocates the unallocated chunk, detected in step S10040, to the virtual volume. More specifically, in the volume pool table for virtual volumes 22600, the controller 21000 changes the virtual volume allocation status 22625 of the detected unallocated chunk from "Unallocated" to "Allocated" and, in addition, registers the access-requested virtual volume specified by the access request, received in step S10010, as the virtual volume to which the chunk is allocated. In addition, in the virtual volume addressing table 22500, the controller 21000 adds the allocated LBA in the access-requested virtual volume specified by the access request, received in step S10010, and registers the unallocated chunk, detected in step S10040, as the allocated chunk corresponding to the allocated LBA. In addition, in the virtual volume table 22300, the controller 21000 updates the assigned capacity of the access-requested virtual volume specified by the access request, received in step S10010, to the value calculated by adding the capacity of the unallocated chunk, detected in step S10040, to the assigned capacity (step S10050).

Next, the controller 21000 returns a response to the access request received in step S10010. More specifically, the controller 21000 references the virtual volume addressing table 22500 based on the information on the access-requested virtual volume and the LBA specified by the access request, received in step S10010, to find the pool and the assigned chunk corresponding to the access-requested volume and the LBA. In addition, based on the pool and the assigned chunk, the controller 21000 references the volume pool table for virtual volumes 22600 to find the pooled volume and the LBA corresponding to the pool and the assigned chunk. After that, the controller 21000 reads data from, or writes data to, the LBA in the pooled volume based on the access request received in step S10010. Finally, the controller 21000 returns the data read/write result as the response to the access request (step S10060). After that, the controller 21000 terminates the processing.

The controller 21000 performs the operation described above when the virtual volume control program 22111 is executed.

Figure 9:
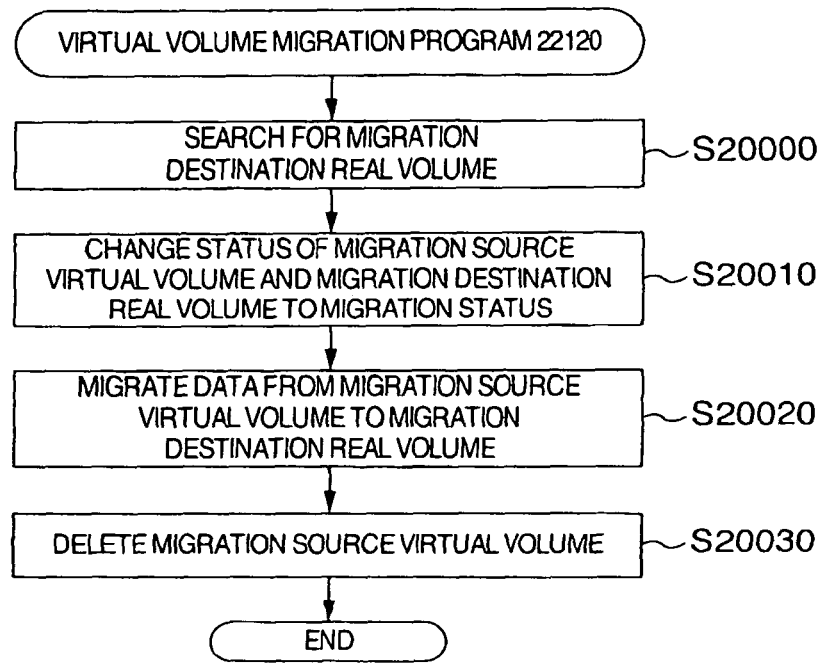
FIG. 9 is a flowchart of a virtual volume migration program in the first embodiment.

FIG. 9 shows the operation of the controller 21000 executed when the virtual volume migration program 22120 is executed in the first embodiment. In the description below, the virtual volume, from which data is migrated in step S10080 of the virtual volume control program 22111, is called a migration source virtual volume.

First, the controller 21000 searches the real volumes 25000 for a migration candidate of the virtual volume. More specifically, the controller 21000 searches the real volume table 22200 for a real volume that has a capacity equal to or larger than that of the migration source virtual volume 26000 and that is not allocated to the host computer. Whether a real volume has a capacity equal to or larger than the virtual capacity of the migration source virtual volume 26000 is determined by comparing the value of the capacity 22215 with the value of the virtual capacity of the migration source virtual volume. Whether a real volume is not allocated to the host computer is determined by checking if the value of the host allocation status 22210 is "Unallocated". If multiple real volume candidates, each of which has a capacity equal to or larger than the virtual capacity of the migration source virtual volume 26000 and is not allocated to the host computer, are found in this step, one of the methods may be used to select one of the real volume candidates. For example, the multiple candidates may be output to the output unit of the management computer or the management client to allow the storage administrator to select one of them. Alternatively, the real volume detected first by the controller 21000 may be used as the real volume candidate. In the description below, one real volume selected in this step as the migration destination is called a migration destination real volume (step S20000).

Next, the controller 21000 places the migration source virtual volume and the migration destination real volume determined in step S20000 into the migration status. More specifically, the controller 21000 copies the value of the host allocation status 22310 of the migration source virtual volume in the virtual volume table 22300 to the host allocation status 22210 of the migration destination real volume in the real volume table 22200. Next, the controller 21000 changes the host allocation status 22310 of the migration source virtual volume in the virtual volume table 22300 to a new value "In Migration" that indicates that the volume is in the migration status. At this time, the controller 21000 also stores the ID of the migration destination real volume (step S20010).

Next, the controller 21000 migrates data from the migration source virtual volume to the migration destination real volume. More specifically, the controller 21000 uses the virtual volume addressing table 22500 to extract a set of the LBA allocated to the migration source virtual volume and the chunk corresponding to the allocated LBA. In the description below, let X be the allocated LBA, and let Y be the chunk corresponding to the allocated LBA. Next, the controller 21000 uses the set (X,Y) and the volume pool table for virtual volumes 22600 to determine to which LBA of which pooled volume the chunk Y corresponds and creates a set (X, Y, pooled volume corresponding to Y, LBA corresponding to Y). Next, for the set (X, Y, pooled volume corresponding to Y, LBA corresponding to Y), the controller 21000 copies the data at the LBA, which corresponds to Y, in the pooled volume, which corresponds to Y, to the LBA X of the real volume. Next, the controller 21000 uses the volume pool table for virtual volumes 22600 to change the allocation status of the virtual volume at LBA, which corresponds to the copied Y, in the pooled volume, which corresponds to the copied Y, to "Unallocated". Finally, the controller 21000 uses the virtual volume addressing table 22500 to delete the entry of (X, Y). The controller 21000 repeats the above processing until no more set of the allocated LBA and the chunk corresponding to the allocated LBA is found in the migration source volume (step S20020).

Finally, the controller 21000 deletes the migration source virtual volume from which data has been migrated. More specifically, the controller 21000 deletes the entry of the migration source virtual volume whose status was changed to the migration status in step S20010 (step S20030).

The controller 21000 performs the operation described above when the virtual volume migration program 22120 is executed. The controller 21000 executes the processing flow shown in FIG. 9 to migrate data from a virtual volume to a real volume so that access data to the virtual volume is continued even when its threshold is exceeded.

Next, to describe more in detail the operation of the controller 21000 performed when the virtual volume control program 22111 in FIG. 7 and the virtual volume migration program 22120 in FIG. 9 are executed, the following describes the state transition of management information stored in the storage system 20000 with reference to FIG. 5, FIG. 10, FIG. 11, and FIG. 12.

In FIG. 5, when the host computer 10000 issues an access request to the range LBA "8 GB to 10 GB" of the virtual volume v101 in the storage system 20000, the controller 21000 in the storage system 20000 executes the virtual volume control program 22111 in FIG. 7.

The controller 21000 receives the access request in step S10010.

Next, because the area specified by the access request issued to the virtual volume v101 is in the range of the LBA "8 GB to 10 GB", the controller 21000 judges in step S10020 that no storage area is allocated to the access area and, so, passes control to step S10030.

Next, in step S10030, the controller 21000 judges that an attempt to allocate an area to the virtual volume v101 will exceed the threshold and, so, passes control to step S10080.

Next, in step S10080, the controller 21000 executes the virtual volume migration program 22120.

Next, according to the flow of the virtual volume migration program 22120, the controller 21000 determines the migration destination real volume v001 in step S20000. In addition, in step S20010, the controller 21000 places the migration source virtual volume v101 and the migration destination real volume v001 into the migration status. As a result, the status of the five tables (real volume table 22200, virtual volume table 22300, virtual volume addressing table 22500, volume pool table for virtual volumes 22600, and parity group table 22700) provided in the storage system 20000 is changed from the status (FIG. 5A, FIG. 5B, FIG. 5C, FIG. 5D, and FIG. 5E) to the status (FIG. 10A, FIG. 10B, FIG. 5C, FIG. 5D, and FIG. 5E). More specifically, the controller 21000 copies the host allocation status of the virtual volume v101 to the host allocation status of the real volume v001 in the real volume table 22200 as shown in FIG. 10A. This allows the access-requested location to be switched without requesting the host computer 10000 to change the PID (ID of I/O port 23000) and the LUN (SCSI LUN number) that indicate the access-requested location. In addition, the controller 21000 updates the host allocation status of the virtual volume v101 in the virtual volume table 22300 to "In migration" as shown in FIG. 10B.

Next, in step S20020, the controller 21000 migrates data from the migration source virtual volume v101 to the migration destination real volume v001. For example, when the data in the range LBA "4 GB to 6 GB" of the migration source virtual volume v101 is migrated, the status of the five tables (real volume table 22200, virtual volume table 22300, virtual volume addressing table 22500, volume pool table for virtual volumes 22600, and parity group table 22700) provided in the storage system 20000 is changed from the status (FIG. 10A, FIG. 10B, FIG. 5C, FIG. 5D, FIG. 5E) to the status (FIG. 10A, FIG. 11A, FIG. 11B, FIG. 11C, and FIG. 5E). More specifically, the controller 21000 migrates the LBA "4 GB to 6 GB" of the migration source virtual volume v101, updates the virtual volume table 22300 as shown in FIG. 11A, deletes the LBA "4 GB to 6 GB" from the virtual volume addressing table 22500 and updates the table as shown in FIG. 11B, and updates the volume pool table for virtual volumes 22600 as shown in FIG. 11C. After that, the controller 21000 migrates data of the LBA "0 GB to 2 GB" and "2 GB to 4 GB" of the migration source virtual volume v101.

Next, when all data is migrated in step S20020, the controller 21000 deletes the migration source virtual volume v101 in step S20030. As a result, the status of the five tables (real volume table 22200, virtual volume table 22300, virtual volume addressing table 22500, volume pool table for virtual volumes 22600, and parity group table 22700) provided in the storage system 20000 is changed from the status (FIG. 10A, FIG. 11A, FIG. 11B, FIG. 11C, and FIG. 5E) to the status (FIG. 10A, FIG. 12A, FIG. 12B, FIG. 12C, and FIG. 5E). More specifically, the controller 21000 deletes the entry of the virtual volume v101 from the virtual volume table 22300 and updates the table as shown in FIG. 12A. In addition, the controller 21000 deletes all entries of the virtual volume v101 from the virtual volume addressing table 22500 and updates the table as shown in FIG. 12B. The controller 21000 also deletes all entries of the virtual volume v101 from the volume pool table for virtual volumes 22600 and updates the table as shown in FIG. 12C.

Next, the controller 21000 terminates the flow of the virtual volume migration program 22120, passes control back to the flow of the virtual volume control program 22111, and passes control to step S10060.

Next, in step S10060, the controller 21000 returns a response to the request from the host computer 10000 to access the range of the LBA "8 GB to 10 GB" of the virtual volume v101 in the storage system 20000 as a response to the request to access the range of the LBA "8 GB to 10 GB" of the real volume v001. Then, the flow of the virtual volume control program 22111 is terminated.

As described above in the general operation, the storage system migrates data from a virtual volume, whose threshold is exceeded, to a real volume to allow the computer system to continue the operation without stopping the data access from the host computer.

In this embodiment, when the virtual volume control program 22111 calls the virtual volume migration program 22120, the controller 21000 of the storage system 20000 returns a response to the access request in step S10060 of the virtual volume control program 22111 after the completion of the data migration from the migration source virtual volume to the migration destination real volume in step S20020 and the deletion of the migration source virtual volume in step S20030 of the virtual volume migration program 22120. Instead, it is also possible to execute step S20020 and step S20030 of the virtual volume migration program 22120 concurrently with the execution of the virtual volume control program 22111.

That is, when the virtual volume control program 22111 calls the virtual volume migration program 22120, the controller 21000 of the storage system 20000 prepares for switching the location, which is accessed by the host computer, to the real volume in step S20000 and step S20010. After the preparation is completed, the controller 21000 starts a child process that executes the data migration processing in step S20020 and the virtual volume deletion processing in step S20030 in the virtual volume migration program 22120. In addition, the controller 21000 returns control back to step S10060 of the virtual volume control program 22111 and returns a response to the access request. By doing so, the controller 21000 can return a response to the access from the host computer to the volume without waiting for the completion of the data migration from the virtual volume to the real volume and the deletion of the virtual volume.

(First Modification)

Next, the following describes the general operation of the storage system in a first modification of the first embodiment.

The first modification differs from the first embodiment in that the controller 21000 searches the pooled volumes for a migration destination candidate during the execution of the virtual volume migration program 22120, changes the migration destination candidate pooled volume to a real volume, and moves data from the migration source virtual volume to the real volume.

Figure 13:
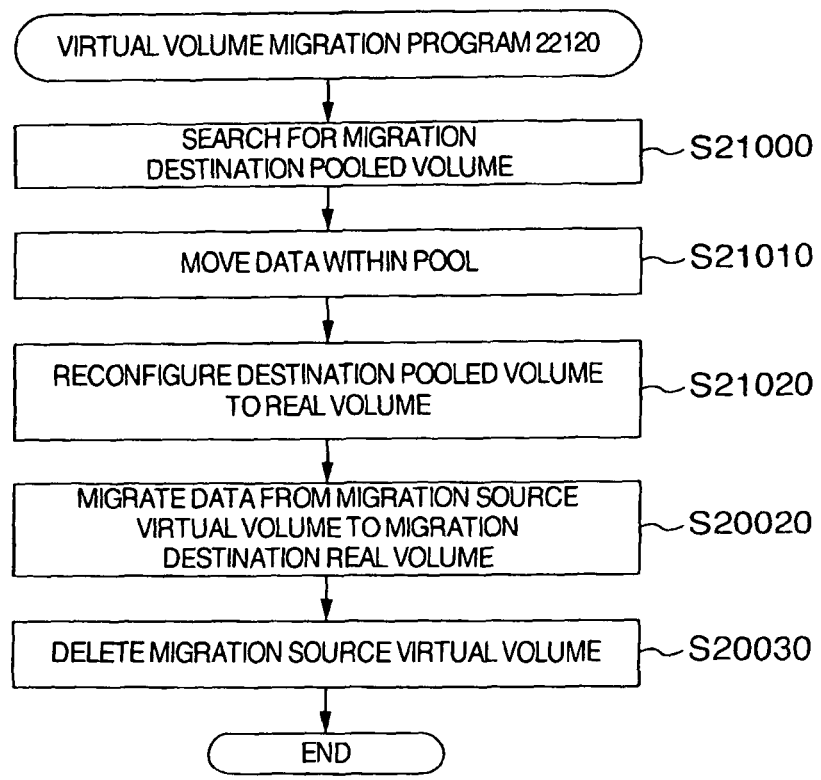
FIG. 13 is a flowchart of a virtual volume migration program in a first modification of the first embodiment.

FIG. 13 shows the operation of the controller 21000 when the virtual volume migration program 22120 is executed in the first modification of the embodiment.

First, the controller 21000 searches the pooled volumes 27000 for the migration destination candidate of the virtual volume. More specifically, the controller 21000 searches the volume pool table for virtual volumes 22600 for a pooled volume having a capacity equal to or larger than the virtual capacity of the migration source virtual volume 26000. Whether a pooled volume has a capacity equal to or larger than the virtual capacity of the migration source virtual volume 26000 is determined by comparing the value of the pooled volume capacity in the pooled volume 22615 with the value of the virtual capacity of the migration source virtual volume. If multiple pooled volume candidates, each of which has a capacity equal to or larger than the virtual capacity of the migration source virtual volume 26000, are found in this step, one of the methods may be used to select one of the pooled volume candidates. For example, the multiple candidates may be output to the output unit of the management computer or the management client to allow the storage administrator to select one of them. Alternatively, the pooled volume detected first by the controller 21000 may be used as the pooled volume candidate. A pooled volume in the pool, for which the controller 21000 can perform data migration that will be described later with the minimum processing, may also be selected as the pooled volume candidate. In the description below, one pooled volume selected in this step as the migration destination is called a migration destination pooled volume (step S21000).

Next, the controller 21000 migrates the data of the migration destination pooled volume. More specifically, the controller 21000 searches the volume pool table for virtual volumes 22600 for one LBA of the migration destination pooled volume that is allocated to the virtual volume. Let X be this LBA. The controller 21000 searches the volume pool table for virtual volumes 22600 for an LBA that belongs to a pooled volume other than the migration destination pooled volume and that is not allocated to any virtual volume. Let Y be this LBA. The controller 21000 copies the data of X to Y. After completion of the copy, the controller 21000 exchanges the virtual volume allocation status of X for that of Y. In addition, the controller 21000 searches the volume pool table for virtual volumes 22600 for the chunk IDs corresponding to X and Y and, in the virtual volume addressing table 22500, updates the assigned chunk 22520, in which the chunk ID corresponding to X is stored, to the chunk ID corresponding to Y. The controller 21000 references the volume pool table for virtual volumes 22600 to repeat the above processing until all the LBAs, allocated to the virtual volume and included in the migration destination pooled volume, are processed (step S21010).

Next, the controller 21000 changes the migration destination pooled volume to a real volume. More specifically, the controller 21000 creates a new entry in the real volume table 22200 for the migration destination pooled volume and deletes the entry of the migration destination pooled volume from the volume pool table for virtual volumes 22600. In addition, in the parity group table 22700, the controller 21000 changes the usage 22715 of the parity group, to which the migration destination volume belongs, to a real volume. After executing this step, the migration destination pooled volume is changed to a migration destination real volume (step S21020).

Next, the controller 21000 migrates data from the migration source virtual volume to the migration destination real volume (step S20020) and deletes the migration source virtual volume (step S20030). Those steps are the same as those in the virtual volume migration program flow in FIG. 9 and, therefore, the description is omitted.

The controller 21000 performs the operation described above when the virtual volume migration program 22120 is executed. By executing the processing flow in FIG. 13, the controller 21000 searches the pooled volumes for a migration destination candidate pooled volume, changes the migration destination candidate pooled volume to a real volume, and migrates data from the virtual volume to the real volume. This sequence of steps enables a data access to the virtual volume to be continued even when its threshold is exceeded.

Next, to describe more in detail the operation of the controller 21000 performed when the virtual volume migration program 22120 in FIG. 13 is executed, the following describes the state transition of management information stored in the storage system 20000 with reference to FIG. 5 and FIG. 14.

Based on the flow of the virtual volume migration program 22120, the controller 21000 determines v203 as the migration destination pooled volume in step S21000.

Next, in step S21010, the controller 21000 migrates data from the migration destination pooled volume v203. In this case, because there is no data to be migrated, no data is migrated.

Next, in step S21020, the controller 21000 changes the migration destination pooled volume v203 to a real volume.

Finally, in step S20020 and step S20030, the controller 21000 migrates data from the migration source virtual volume v101 to the migration destination real volume v203 and, after all data is migrated, deletes the migration source virtual volume v101.

Figures 14E, 15:
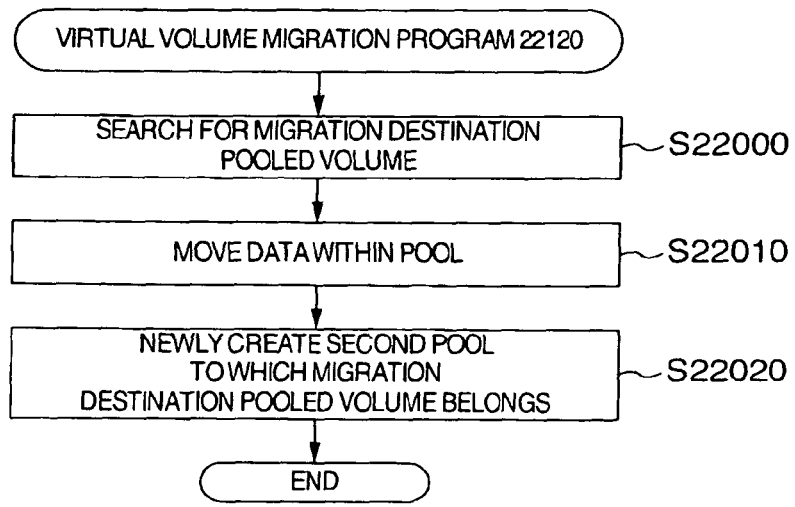
FIG. 14E is a diagram showing an example of the parity group table in the first modification of the first embodiment.
FIG. 15 is a flowchart of a virtual volume migration program in a second modification of the first embodiment.

As a result, the status of the five tables (real volume table 22200, virtual volume table 22300, virtual volume addressing table 22500, volume pool table for virtual volumes 22600, and parity group table 22700) provided in the storage system 20000 is changed from the status (FIG. 5A, FIG. 5B, FIG. 5C, FIG. 5D, and FIG. 5E) to the status (FIG. 14A, FIG. 14B, FIG. 14C, FIG. 14D, and FIG. 14E). More specifically, the controller 21000 creates a new entry in the real volume table 22200 for the real volume v203, migrates data of the virtual volume v101, and updates the table as shown in FIG. 14A. In addition, the controller 21000 deletes the entry of the virtual volume v101 from the virtual volume table 22300 and updates the table as shown in FIG. 14B. In addition, the controller 21000 deletes the entry of the virtual volume v101 from the virtual volume addressing table 22500 and updates the table as shown in FIG. 14C. In addition the controller 21000 deletes the entry of the pooled volume v203 from the volume pool table for virtual volumes 22600 and updates the table as shown in FIG. 14D. In addition, the controller 21000 changes the usage of the parity group PG06, to which the volume v203 belongs, to a real volume in the parity group table 22700 and updates the table as shown in FIG. 14E.

The general operation of the storage system in the first modification of the first embodiment is as described above.

As described above in the general operation, even when there is not enough unallocated real volumes, the storage system changes a pooled volume to a real volume and migrates data from a virtual volume, whose threshold is exceeded, to the real volume to allow the computer system to continue the operation without stopping a data access from the host computer.

In this embodiment, when the virtual volume control program 22111 calls the virtual volume migration program 22120, the controller 21000 of the storage system 20000 returns a response to the access request in step S10060 of the virtual volume control program 22111 after the completion of the data migration from the migration source virtual volume to the migration destination real volume in step S20020 and the deletion of the migration source virtual volume in step S20030 of the virtual volume migration program 22120. Instead, it is also possible to execute step S20020 and step S20030 of the virtual volume migration program 22120 concurrently with the execution of the virtual volume control program 22111. That is, when the virtual volume control program 22111 calls the virtual volume migration program 22120, the controller 21000 of the storage system 20000 prepares for switching the location, which is accessed by the host computer, to the real volume in step S21000, step S21010, and step S21020. After the preparation is completed, the controller 21000 starts a child process that executes the data migration processing in step S20020 and the virtual volume deletion processing in step S20030 in the virtual volume migration program 22120. In addition, the controller 21000 returns control back to step S10060 of the virtual volume control program 22111 and returns a response to the access request. By doing so, the controller 21000 can return a response to the access from the host computer to the volume without waiting for the completion of the data migration from the virtual volume to the real volume and the deletion of the virtual volume.

(Second Modification)

Next, the following describes the general operation of the storage system in a second modification of the first embodiment.

The second modification differs from the first embodiment in that the controller 21000 searches the pooled volumes in the volume pool for virtual volumes, to which the virtual volume belongs before the migration (this pool is called a first volume pool for virtual volumes), for a migration destination candidate during the execution of the virtual volume migration program 22120, changes the configuration in such a way that the migration destination candidate pooled volume newly constitutes a second volume pool for virtual volumes, and continues the operation of the virtual volume.

FIG. 15 shows the operation of the controller 21000 during the execution of the virtual volume migration program 22120 in the second modification of the first embodiment.

First, the controller 21000 searches the pooled volumes 27000 for the migration destination candidate of the virtual volume. More specifically, the controller 21000 searches the volume pool table for virtual volumes 22600 for a pooled volume, for which the controller 21000 can perform data migration that will be described later with the minimum processing, and determines the pooled volume as the pooled volume candidate. As the method for selecting the pooled volume candidate, the pooled volume detected first by the controller 21000 may be used as the pooled volume candidate. Alternatively, the multiple candidates may be output to the output unit of the management computer or the management client to allow the storage administrator to select one of them. The virtual volume migration candidate selection differs from that of the first modification in that the virtual capacity of the migration source virtual volume 26000 is not used for selecting the pooled volume candidate. In the description below, one pooled volume selected in this step as the migration destination is called a migration destination pooled volume (step S22000).

Next, the controller 21000 migrates the data of the migration destination pooled volume. Note that, in this step, the controller 21000 migrates data, which is the virtual volume data stored in the migration destination pooled volume but is not the data of the migration source virtual volume, to another pooled volume and, in addition, migrates the migration source virtual volume data, which is stored in a pooled volume other than the migration destination pooled volume, to the migration destination pooled volume. The data migration operation of the controller 21000 is the same as that in step S21010 in the first modification. Therefore, the detailed description is omitted (step S22010).

Finally, the controller 21000 newly creates a second volume pool for virtual volumes to which the migration destination pooled volume is to belong. More specifically, in the volume pool table for virtual volumes 22600, the controller 21000 creates an entry for the second volume pool for virtual volumes, registers the migration destination pooled volume as a pooled volume belonging to the second volume pool for virtual volumes, and deletes the migration destination pooled volume from the pooled volume entries of the first volume pool for virtual volumes. In addition, in the virtual volume addressing table 22500, the controller 21000 changes the pool, to which the migration source virtual volume belongs, to the second volume pool for virtual volumes (step S22020).

The controller 21000 performs the operation described above when the virtual volume migration program 22120 is executed. By executing the processing flow in FIG. 15, the controller 21000 allows the host computer to continue the data access while continuing the virtual volume operation.

Next, to describe more in detail the operation of the controller 21000 performed when the virtual volume migration program 22120 in FIG. 15 is executed, the following describes the state transition of management information stored in the storage system 20000 with reference to FIG. 5, FIG. 16, and FIG. 17.

Based on the flow of the virtual volume migration program 22120, the controller 21000 determines v201 as the migration destination pooled volume in step S22000.

Next, in step S22010, the controller 21000 migrates data, which is the virtual volume data stored in the migration destination pooled volume v201 but is not the data of the migration source virtual volume v101, to another pooled volume and, in addition, migrates the data of the migration source virtual volume v101, which is stored in a pooled volume other than the migration destination pooled volume v201, to the migration destination pooled volume v201.

As a result, the status of the five tables (real volume table 22200, virtual volume table 22300, virtual volume addressing table 22500, volume pool table for virtual volumes 22600, and parity group table 22700) provided in the storage system 20000 is changed from the status (FIG. 5A, FIG. 5B, FIG. 5C, FIG. 5D, and FIG. 5E) to the status (FIG. 5A, FIG. 5B, FIG. 16A, FIG. 16B, and FIG. 5E). More specifically, in the volume pool table for virtual volumes 22600, the controller 21000 migrates the data of the chunk ch04 stored in the migration destination pooled volume v201 to the chunk ch08 and migrates the data of the chunk ch05 to the chunk ch09. The result is as shown in FIG. 16B. In addition, in the virtual volume addressing table 22500, the controller 21000 updates the assigned chunk of the virtual volume v102 to ch08 and updates the assigned chunk of the virtual volume v103 to ch09. The result is as shown in FIG. 16A.

Finally, in step S22020, the controller 21000 newly creates a second volume pool for virtual volumes p2 to which the migration destination pooled volume v201 is to belong.

As a result, the status of the five tables (real volume table 22200, virtual volume table 22300, virtual volume addressing table 22500, volume pool table for virtual volumes 22600, and parity group table 22700) provided in the storage system 20000 is changed from the status (FIG. 5A, FIG. 5B, FIG. 16A, FIG. 16B, and FIG. 5E) to the status (FIG. 5A, FIG. 5B, FIG. 17A, FIG. 17B, and FIG. 5E). More specifically, in the volume pool table for virtual volumes 22600, the controller 21000 creates an entry for the second volume pool for virtual volumes p2, registers the migration destination pooled volume v201 as a pooled volume belonging to p2, and deletes the migration destination pooled volume v201 from the pool volume entries of the first volume pool for virtual volumes p1. The result is as shown in FIG. 17B. In addition, in the virtual volume addressing table 22500, the controller 21000 changes the pool, to which the migration source virtual volume v101 belongs, to the second volume pool for virtual volumes p2. The result is as shown in FIG. 17A.

The general operation of the storage system in the second modification of the first embodiment is as described above.

As described above in the general operation, even when there is not enough unallocated real volumes and pooled volumes, the storage system newly creates a second volume pool for virtual volumes and continues the operation of a virtual volume, whose threshold is exceeded, to allow the computer system to continue the operation without stopping a data access from the host computer.

The first embodiment has been described.

In the first embodiment, the storage system migrates data of a virtual volume, whose threshold is exceeded, to allow the computer system to continue the operation without stopping a data access from the host computer.

Second Embodiment

In a second embodiment, a virtual volume configuration program is added to the management computer in the configuration of the first embodiment. Based on the data migration method specified by a storage administrator when a virtual volume is created, the processor of the management computer executes the virtual volume configuration program to select one of the multiple data migration methods described in the above embodiment. The following describes how the data migration method is selected.

First, the configuration of a computer system and the general operation of a storage system in the second embodiment will be described.

Figure 18:
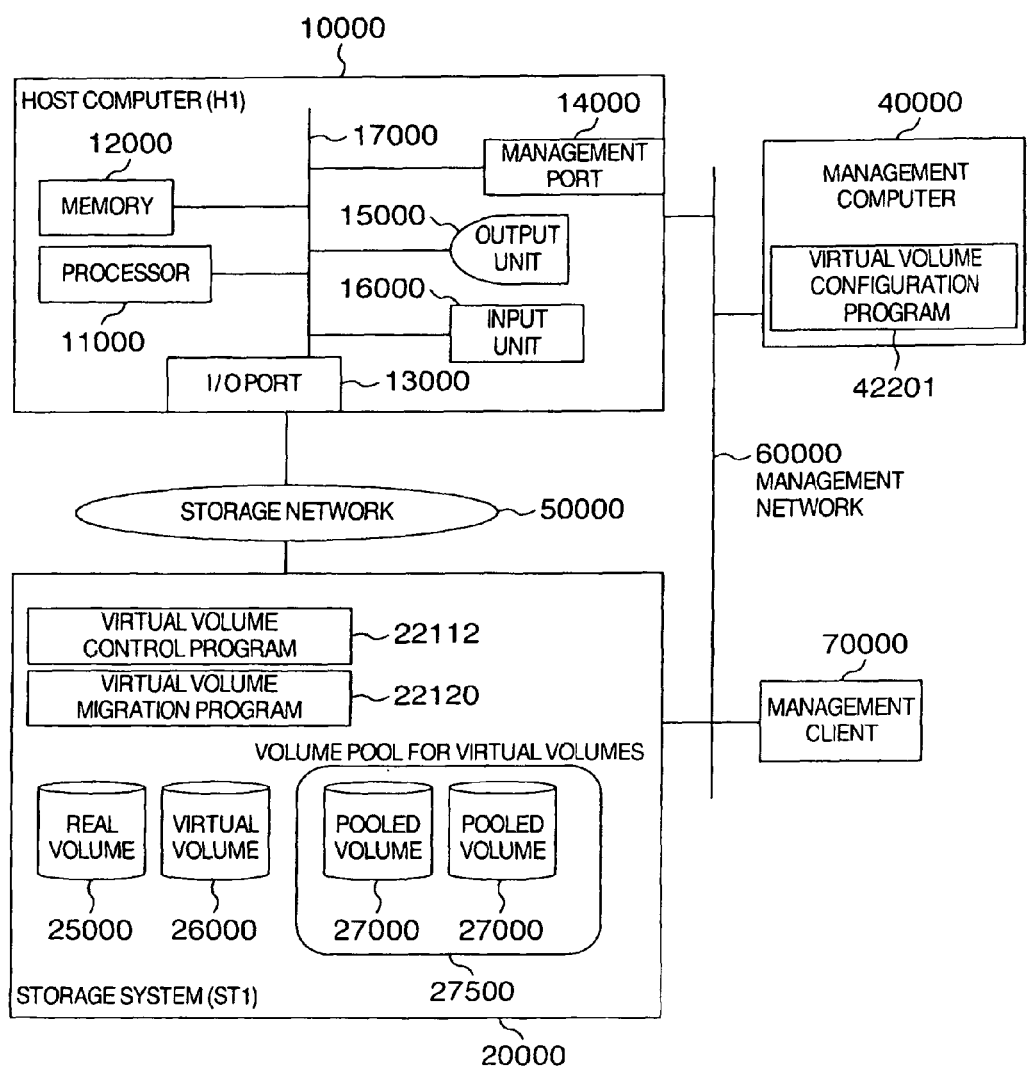
FIG. 18 is a diagram showing an example of the configuration of a computer system in a second embodiment.
Figure 19:
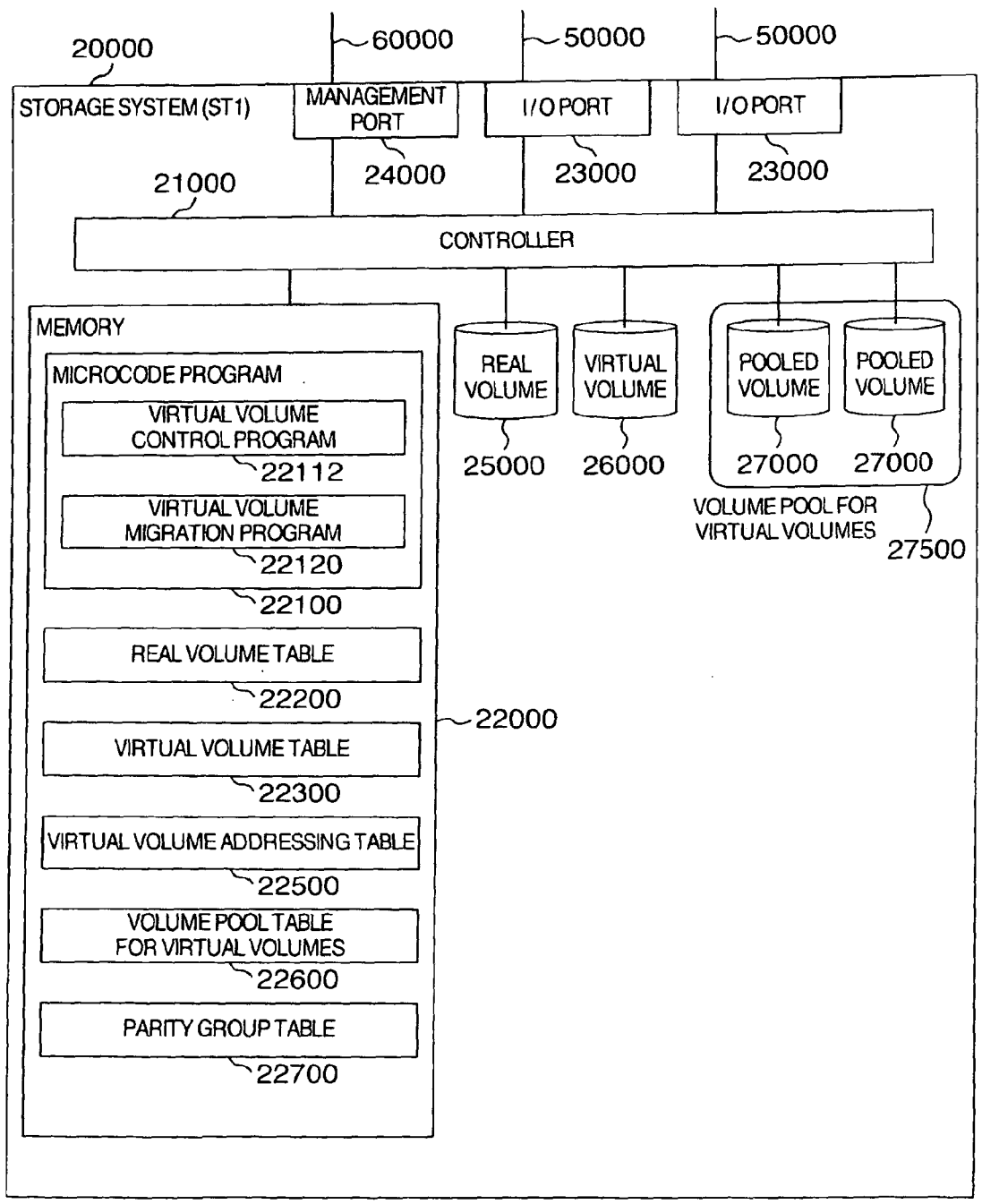
FIG. 19 is a diagram showing an example of the configuration of a storage system in the second embodiment.
Figure 20:
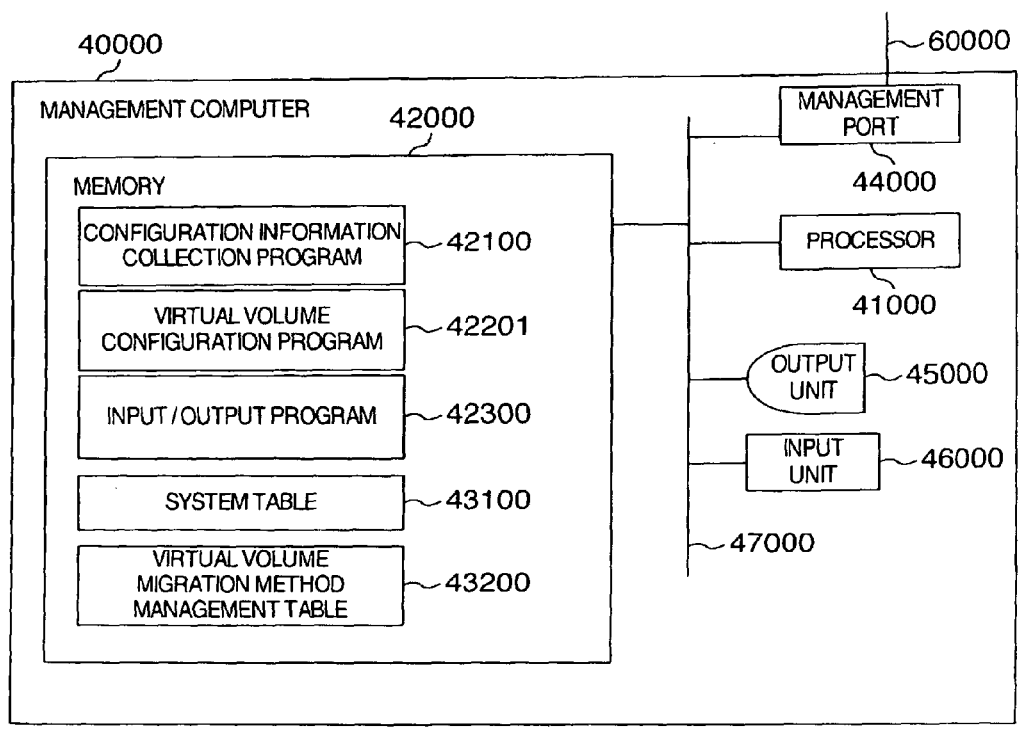
FIG. 20 is a diagram showing an example of the configuration of a management computer in the second embodiment.

The following describes the configuration of the computer system configuration in the second embodiment. FIGS. 18-20 show the configuration of the computer system and the configuration of the devices connected to the computer system. The following describes only the part of the configuration of the computer system in the second embodiment that is different from that in the first embodiment. The part of the configuration not mentioned is the same as that of the conventional system.

FIG. 18 shows an example of the configuration of the computer system in the second embodiment. The second embodiment differs from the first embodiment in that a storage system 20000 has a virtual volume control program 22112 that performs processing different from that in the first embodiment and in that a management computer 40000 has a virtual volume configuration program 42201 that performs processing different from that in the first embodiment. The detail will be described later.

FIG. 19 shows an example of the configuration of the storage system in the second embodiment.

Unlike the first embodiment, a part of a microcode program 22100 in a memory 22000 includes a virtual volume control program 22112 and a virtual volume migration program 22120 of the second embodiment. Those virtual volume control program 22112 and the virtual volume migration program 22120 are also read from a storage medium (not shown), such as a hard disk, when the storage system is started.

FIG. 20 shows an example of the configuration of the management computer in the second embodiment.

Unlike the first embodiment, a memory 42000 includes the virtual volume configuration program 42201 for setting a virtual volume and determining a virtual volume migration condition and a virtual volume migration method management table 43200 for managing the received virtual volume migration methods. The virtual volume configuration program 42201 is implemented when a processor 41000 reads it from a storage medium (not shown), such as a hard disk, into the memory 42000. The virtual volume setting processing of the virtual volume configuration program 42201 is the same as that in the first embodiment. Therefore the detailed description of the flow is omitted. The virtual volume migration method management table 43200 will be described later. The processing for determining the virtual volume migration method will also be described later.

The configuration of the computer system in the second embodiment has been described.

Next, the following describes the general operation of the computer system in the second embodiment with focus on the data access processing for a virtual volume.

The data access processing is implemented when a controller 21000 in the storage system 20000 executes the virtual volume control program 22112. Therefore, the following describes the operation of the controller 21000 that is performed when the virtual volume control program 22112 is executed.

FIG. 21 is a flowchart showing the operation of the controller 21000 when the virtual volume control program 22112 is executed in the second embodiment. Note that, in the description of the virtual volume control program 22112 in the second embodiment, only the difference from the virtual volume control program 22111 in the first embodiment will be described. The operation not mentioned below is the same as that of the virtual volume control program 22111 in the first embodiment.

First, the controller 21000 creates a virtual volume. An actual example will be described with reference to FIG. 22. The processor 41000 of the management computer 40000 executes the virtual volume configuration program to display a virtual volume creation screen 90000 such as the one shown in FIG. 22A. The difference from the virtual volume creation screen 90000 in the first embodiment is that a migration method entry field 90035 is added for receiving the data migration method of the virtual volume. The data migration method entered in the migration method entry field 90035 can be managed on a virtual volume basis as shown in FIG. 22B. For example, when a storage administrator enters the parameters shown in FIG. 22A to create a virtual volume, the processor 41000 of the management computer 40000 creates a virtual volume in the storage system ST1 wherein the virtual capacity is 10 GB, the data migration threshold is 6 GB that is 60% of the virtual capacity, the assigned PID is p1, the assigned LUN is 1 and, as the virtual volume data migration method, the method for migrating data to a real volume is selected (step S10000).

Step S10010, step S10020, step S10030, step S10040, step S10050, step S10060, step S10070, and step S10080 are the same as those in the first embodiment. The description is omitted.

If a threshold 22320 is exceeded in step S10030, the controller 21000 inquires the virtual volume configuration program of the management computer 40000 about the virtual volume data migration method to determine the virtual volume data migration method. The data migration method mentioned here is one of the virtual volume migration program in the first embodiment, the virtual volume migration program in the first modification of the first embodiment, and the virtual volume migration program in the second modification of the first embodiment (step S10090).

Next, according to the virtual volume data migration method that is returned from the management computer 40000 as a response, the controller 21000 executes the virtual volume migration program (step S10080).

The operation of the controller 21000 performed when the virtual volume control program 22112 is executed is as described above.

Figure 23:
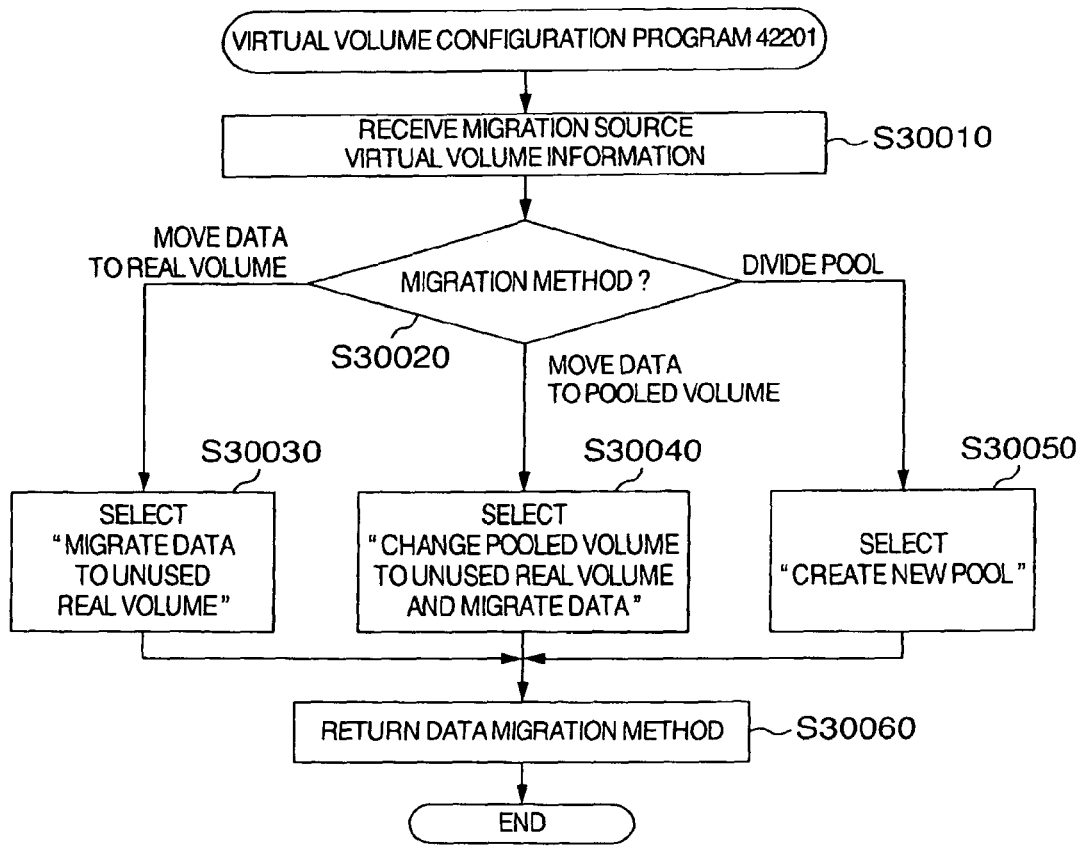
FIG. 23 is a flowchart of a virtual volume configuration program in the second embodiment.

FIG. 23 is a flowchart showing the operation of the processor 41000 of the management computer 40000 in the second embodiment when the virtual volume configuration program 42201 is executed.

First, the processor 41000 receives the information on the migration source virtual volume from the storage system 20000 (step S30010).

Next, the processor 41000 determines the migration method of the migration source virtual volume obtained in step S30010. More specifically, the processor 41000 determines the virtual volume data migration method shown in FIG. 22B, which was obtained in step S10000 of the virtual volume control program 22112 executed when the migration source virtual volume was created, as the data migration method of the migration source virtual volume (step S30020).

If it is found in step S30020 that "Migrate data to real volume" was entered into the migration method entry field 90035 when the migration source virtual volume was created, the processor 41000 selects the method, described in the first embodiment, in which data is migrated to an unused real volume (step S30030), sends the selected migration method to the storage system 20000 as the response (step S30060), and terminates the program.

If it is found in step S30020 that "Change pooled volume to unused real volume and migrate data" was entered into the migration method entry field 90035 when the migration source virtual volume was created, the processor 41000 selects the method, described in the first modification of the first embodiment, in which a pooled volume is changed to an unused real volume to which data is migrated (step S30040), sends the selected migration method to the storage system 20000 as the response (step S30060), and terminates the program.

If it is found in step S30020 that "Create new pool" was entered into the migration method entry field 90035 when the migration source virtual volume was created, the processor 41000 selects the method, described in the second modification of the first embodiment, in which a new pool to which data is migrated is created (step S30050), sends the selected migration method to the storage system 20000 as the response (step S30060), and terminates the program.

As described in the general operation, the management computer issues an instruction to migrate the data of a virtual volume, whose threshold is exceeded, using a method specified by a storage administrator in advance to allow the computer system to continue the operation without stopping a data access from the host computer.

(First Modification)

Next, the following describes a modification of the computer system operation in the second embodiment.

This modification differs from the second embodiment in that, when the virtual volume migration method is determined, the processor 41000 of the management computer takes into consideration the capacity of an unallocated real volume and the capacity of a pooled volume in the volume pool for virtual volumes at the time the migration method is determined.

The description of the operation of the controller 21000 during the execution of the virtual volume control program 22112 in this modification is omitted because the operation of the controller 21000 is similar to that in the second embodiment. The only difference is that the processor 41000 of the management computer displays a virtual volume creation screen 90000, such as the one shown in FIG. 24A, in step S10000. The virtual volume creation screen in FIG. 24A differs from that in FIG. 22A in that a storage administrator enters one of the following two virtual volume data migration methods in the migration method entry field 90035: "Priority on real volume" indicating that priority is on the migration to an unallocated real volume and "Priority on pooled volume" indicating that priority is on a pooled volume in a volume pool for virtual volumes. The data migration method entered in the migration method entry field 90035 is managed on a virtual volume basis, for example, as shown in FIG. 24B. For example, when the storage administrator creates a virtual volume with the parameters in FIG. 24A as the input, the processor 41000 of the management computer 40000 creates a virtual volume in the storage system ST1 where the virtual capacity is 10 GB, the data migration threshold is 6 GB that is 60% of the virtual capacity, the assigned PID is p1, the assigned LUN is 1 and, when the data is migrated from the virtual volume, priority is placed on the data migration to the real volume.

The operation of the controller 21000 during the execution of the virtual volume control program 22112 is as described above.

Figure 25:
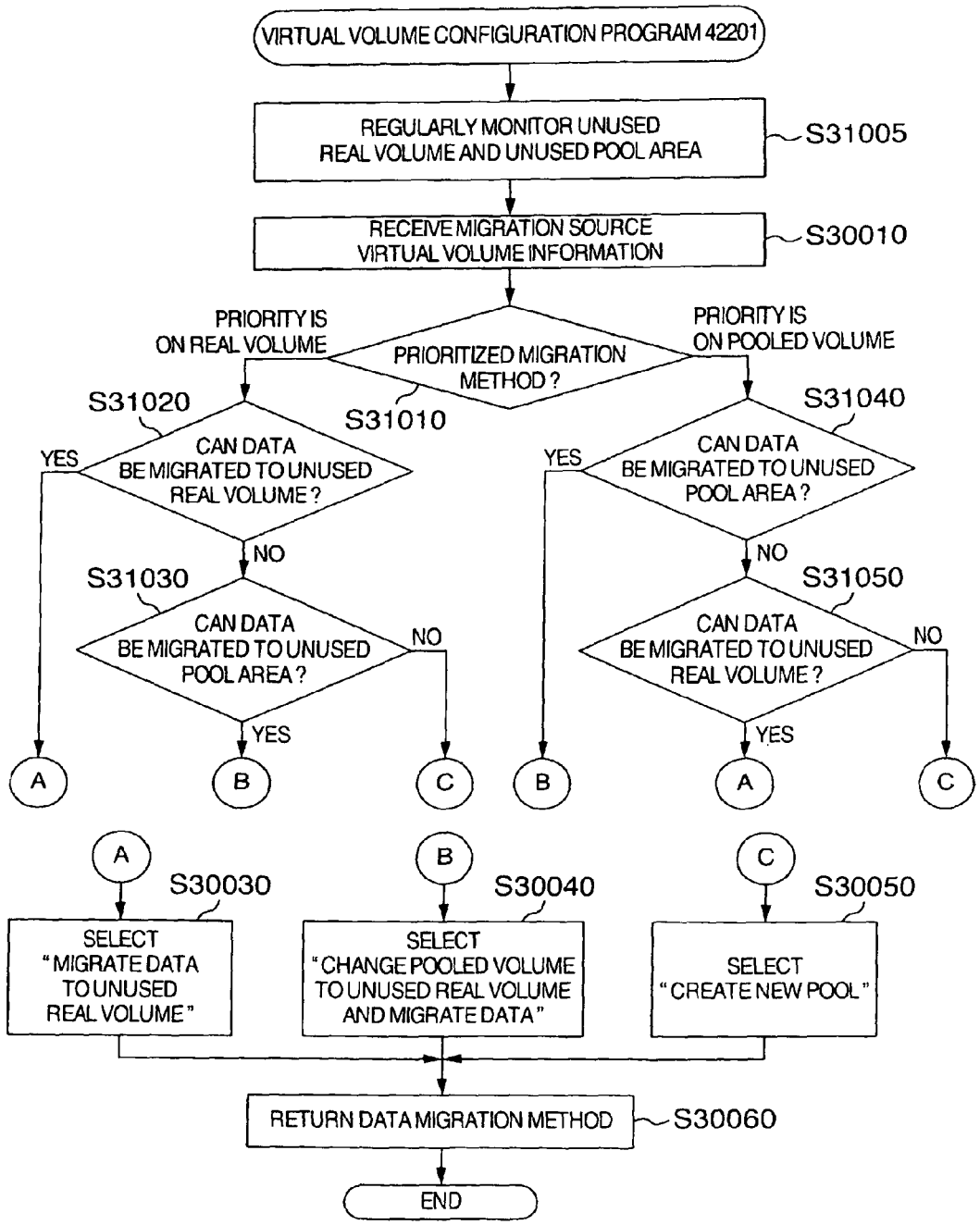
FIG. 25 is a flowchart of a virtual volume configuration program in the first modification of the second embodiment.

FIG. 25 is a flowchart showing the operation of the processor 41000 of the management computer 40000 when the virtual volume configuration program 42201 is executed in this modification.

First, the processor 41000 monitors the status of the unused real volumes and unused pool areas in the storage system 20000 at a regular interval. More specifically, the processor 41000 obtains a list of unused real volumes in the real volume table 22200, a list of pooled volumes in the volume pool table for virtual volumes 22600, and a list of virtual volumes in the virtual volume table 22300 from the storage system 20000 (step S31005). The information obtained in this step is used in steps S31020, S31030, S31040, and S31050 that will be described later.

The processor 41000 receives migration source virtual volume information from the storage system 20000 (step S30010).

Next, the processor 41000 determines a prioritized migration method that will be used when data is migrated from the migration source virtual volume obtained in step S30010. More specifically, the processor 41000 determines the virtual volume data migration method, which was obtained in step S10000 of the virtual volume control program 22112 when the migration source virtual volume was created and which is shown in FIG. 24B, as the prioritized migration method (step S31010).

If it is found in step S31010 that the prioritized migration method is "migration to real volume", the processor 41000 checks if it is possible to migrate data to an unused real volume in the storage system 20000 (step S31020) and, if possible, passes control to step S30030. In this case, if a migration destination real volume can be selected from the list of unused real volumes obtained regularly in step S31005, the processor 41000 determines that data can be migrated thereto. As an alternative determination method, the processor 41000 can also determine that data can be migrated to an unused real volume if its total capacity exceeds a predetermined threshold.

If data cannot be migrated to an unused real volume in step S31020, the processor 41000 checks if data can be migrated to a pooled volume (step S31030). If data can be migrated, control is passed to step S30040; otherwise, control is passed to step S30050. In this case, if a migration destination pooled volume having a capacity exceeding the virtual capacity of the migration source virtual volume can be selected from the list of pooled volumes regularly obtained in step S31005, the processor 41000 determines that data can be migrated to the pooled volume. If a migration destination pooled volume having a capacity exceeding the virtual capacity of the migration source virtual volume cannot be selected from the list of pooled volumes regularly obtained in step S31005, the processor 41000 determines that data cannot be migrated to the pooled volume.

If it is found in step S31010 that the prioritized migration method is "migration to pooled volume", the processor 41000 checks if it is possible to migrate data to a pooled volume (step S31040) and, if possible, passes control to step S30040. The processor 41000 checks if data can be migrated in step S31040 in the same way as in step S31030 and, so, the description is omitted.

If data cannot be migrated to a pooled volume in step S31040, the processor 41000 checks if data can be migrated to a real volume (step S31050). If data can be migrated, control is passed to step S30030; otherwise, control is passed to step S30050. The processor 41000 checks if data can be migrated in step S31050 in the same way as in step S31020 and, so, the description is omitted.

Step S30030, step S30040, step S30050, and step S30060 are the same as those in FIG. 23 and, so, the description is omitted.

As described in the general operation, the management computer monitors the capacity of an unallocated real volume and the capacity of an unallocated pooled volume at a regular interval and, if the virtual volume threshold is exceeded, determines the data migration method based on the capacity of the unallocated real volume, the capacity of the pooled volume, and the migration condition specified by the storage administrator in advance. This allows the computer system to continue the operation without stopping a data access from the host computer.

In the second embodiment described above, the storage system migrates the data of a virtual volume, whose threshold is exceeded, according to the data migration condition specified by the storage administrator in advance, thus allowing the computer system to continue the operation without stopping a data access from the host computer.

According to the first embodiment and the second embodiment described above, a computer system, including even a large-scale data center, can easily manage a large number of volumes.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A storage system connected to a plurality of host computers and a management computer, comprising:
   an interface unit which is coupled to the plurality of host computers and the management computer via a network;
   a control unit which is coupled to said interface unit and provides virtual volumes to the plurality of host computers; and
   a plurality of physical storage devices in which data used by the plurality of host computers is stored,
   wherein the control unit manages a plurality of volumes prepared by the plurality of physical storage devices,
   wherein the plurality of volumes includes a plurality of pool volumes constituting a storage area pool for providing chunks of the physical storage devices to the virtual volumes,
   wherein virtual volume address information is provided which includes logical addresses of storage areas allocated to the virtual volumes and information regarding the chunks corresponding to the logical addresses,
   wherein storage area pool information is provided which includes information showing a correspondence relationship between the logical addresses of storage areas provided by the pool volumes and the chunks of the physical storage devices,
   wherein the control unit migrates data stored in a chunk allocated to one of the virtual volumes to one of the plurality of volumes based on the virtual volume address information and the storage area pool information,
   wherein the control unit identifies, from the virtual volume address information, a first logical address of a storage area allocated to a migration source virtual volume of the virtual volumes and a chunk corresponding to the migration source virtual volume,
   wherein the control unit uses the chunk corresponding to the migration source volume to identify, from the storage area pool information, a pool volume corresponding to the chunk and a second logical address of the pool volume corresponding to the chunk,
   wherein the control unit copies the data at the second logical address of the pool volume to a third logical address of a real volume, the real volume being a migration destination real volume, and wherein the storage area pool information further includes an allocation status for each virtual volume, the allocation status providing an indication of whether the chunks are allocated or unallocated to the respective virtual volumes.

2. The storage system according to claim 1, wherein the control unit changes the allocation status of the virtual volume corresponding to the chunk at the third logical address to unallocated, and wherein the control unit deletes an entry corresponding to the first logical address and the chunk corresponding to the first logical address.

3. A method of allocating a data storage area in a storage system, the storage system being connected to a plurality of host computers and a management computer, and the storage system comprising an interface unit which is coupled to the plurality of host computers and the management computer via a network, a control unit which is coupled to said interface unit and provides virtual volumes to the plurality of host computers, and a plurality of physical storage devices in which data used by the plurality of host computers is stored, the method comprising:
   sending, by a management computer, a request to migrate data;
   managing, by the control unit, a plurality of volumes prepared by the plurality of physical storage devices in response to the request,
   wherein the plurality of volumes includes a plurality of pool volumes constituting a storage area pool for providing chunks of the physical storage devices to the virtual volumes,
   wherein virtual volume address information is provided which includes logical addresses of storage areas allocated to the virtual volumes and information regarding the chunks corresponding to the logical addresses,
   wherein storage area pool information is provided which includes information showing a correspondence relationship between the logical addresses of storage areas provided by the pool volumes and the chunks of the physical storage devices; and
   migrating, by the control unit, data stored in a chunk allocated to one of the virtual volumes to one of the plurality of volumes based on the virtual volume address information and the storage area pool information, and identifying, from the virtual volume address information, a first logical address of a storage area allocated to a migration source virtual volume of the virtual volumes and a chunk corresponding to the migration source virtual volume;
   using the chunk corresponding to the migration source volume to identify, from the storage area pool information, a pool volume corresponding to the chunk and a second logical address of the pool volume corresponding to the chunk; and copying, by the control unit, the data at the second logical address of the pool volume to a third logical address of a real volume, the real volume being a migration destination real volume, wherein the storage area pool information further includes an allocation status for each virtual volume, the allocation status providing an indication of whether the chunks are allocated or unallocated to the respective virtual volumes.

4. The method according to claim 3, changing the allocation status of the virtual volume corresponding to the chunk at the third logical address to unallocated; and deleting an entry corresponding to the first logical address and the chunk corresponding to the first logical address.

\* \* \* \* \*